(12) United States Patent
Racz et al.

(10) Patent No.: US 7,942,317 B2
(45) Date of Patent: *May 17, 2011

(54) DATA STORAGE AND ACCESS SYSTEMS

(75) Inventors: Patrick Racz, Saint Heller (JE);
Hermen-ard Hulst, Amsterdam (NL)

(73) Assignee: Smartflash Technologies Limited, Road Town, Tortola ( * ) Notice: Subject to any disclaimer, the term of this patent is extended or adjusted under 35 U.S.C. 154(b) by 245 days.

This patent is subject to a terminal disclaimer.

(21) Appl. No.: 12/014,558

(22) Filed: Jan. 15, 2008

(65) Prior Publication Data

US 2008/0314974 A1 Dec. 25, 2008

Related U.S. Application Data

(63) Continuation of application No. 11/336,758, filed on Jan. 19, 2006, now Pat. No. 7,334,720, which is a continuation of application No. 10/111,716, filed as application No. PCT/GB00/04110 on Oct. 25, 2000, now abandoned.

(30) Foreign Application Priority Data

Nov. 25, 1999 (GB) .................................. 9925227.2

(51) Int. Cl.
*G06K 5/00* (2006.01)

(52) U.S. Cl. ....................................... 235/380; 235/382

(58) Field of Classification Search .................. 235/451, 235/380, 382, 492; 711/100, 101, 103
See application file for complete search history.

(56) References Cited

U.S. PATENT DOCUMENTS

| | | | |
|---|---|---|---|
| 4,697,073 A | 9/1987 | Hara | |
| 5,226,145 A | 7/1993 | Moronaga et al. | |
| 5,367,150 A | 11/1994 | Kitta et al. | |
| 5,406,619 A | 4/1995 | Akhteruzzaman et al. | |
| 5,457,746 A | 10/1995 | Dolphin | |
| 5,532,466 A | 7/1996 | Konno et al. | |
| 5,588,146 A | 12/1996 | Leroux | |
| 5,677,953 A | 10/1997 | Dolphin | |
| 5,703,951 A | 12/1997 | Dolphin | |
| 5,740,369 A * | 4/1998 | Yokozawa et al. | ............ 709/217 |
| 5,744,787 A | 4/1998 | Teicher | |
| 5,754,654 A | 5/1998 | Hiroya et al. | |

(Continued)

FOREIGN PATENT DOCUMENTS

EP 0 195 098 10/1990

(Continued)

*Primary Examiner* — Thien M Le

(74) *Attorney, Agent, or Firm* — Kilpatrick Townsend Stockton LLP

(57) ABSTRACT

Data storage and access systems are described for downloading and paying for data such as audio and video data, text, software, games and other types of data. A portable data carrier has an interface for sending and receiving data, non-volatile data memory for storing received content data and non-volatile payment validation memory for providing payment validation data to an external device. The carrier may also store a record of access made to the stored content, and content use rules for controlling access to the stored content. Preferred embodiments store further access control data and supplementary data such as hot links to web sites and/or advertising data. A complementary data access terminal, data supply computer system and data access device are also described. The combination of payment data and stored content data and, in preferred embodiments, use rule data, helps reduce the risk of unauthorized access to data such as compressed music and video data, especially over the Internet.

19 Claims, 17 Drawing Sheets

U.S. PATENT DOCUMENTS

| | | | |
|---|---|---|---|
| 5,794,202 | A | 8/1998 | Kim |
| 5,809,241 | A | 9/1998 | Hanel et al. |
| 5,845,281 | A | 12/1998 | Benson et al. |
| 5,847,372 | A | 12/1998 | Kreft |
| 5,889,860 | A | 3/1999 | Eller et al. |
| 5,901,330 | A | 5/1999 | Sun et al. |
| 5,918,213 | A | 6/1999 | Bernard et al. |
| 5,923,884 | A | 7/1999 | Peyret et al. |
| 5,933,498 | A | 8/1999 | Schneck et al. |
| 5,936,220 | A | 8/1999 | Hoshino et al. |
| 6,012,634 | A | 1/2000 | Brogan et al. |
| 6,018,720 | A | 1/2000 | Fujimoto |
| 6,078,917 | A | 6/2000 | Paulsen et al. |
| 6,119,945 | A | 9/2000 | Muller et al. |
| 6,142,369 | A | 11/2000 | Jonstromer |
| 6,202,056 | B1 | 3/2001 | Nuttall |
| 6,385,731 | B2 | 5/2002 | Ananda |
| 6,424,975 | B1 | 7/2002 | Walter et al. |
| 6,442,570 | B1 | 8/2002 | Wu |
| 6,473,829 | B1 | 10/2002 | Dahman et al. |
| 6,510,236 | B1 | 1/2003 | Crane et al. |
| 6,553,413 | B1 | 4/2003 | Leighton et al. |
| 6,554,192 | B2 * | 4/2003 | Tingl .................... 235/487 |
| 6,574,643 | B2 | 6/2003 | Walter et al. |
| 6,658,568 | B1 | 12/2003 | Ginter et al. |
| 6,993,507 | B2 * | 1/2006 | Meyer et al. .................... 705/40 |
| 6,999,936 | B2 | 2/2006 | Sehr |
| 7,000,836 | B2 | 2/2006 | Saeki |
| 7,044,362 | B2 | 5/2006 | Yu |
| 7,083,081 | B2 | 8/2006 | McGee et al. |
| 7,334,720 | B2 * | 2/2008 | Hulst et al. .................... 235/380 |
| 7,677,446 | B2 * | 3/2010 | Wise ............................ 235/380 |
| 2003/0168515 | A1 | 9/2003 | Gray |
| 2006/0249570 | A1 * | 11/2006 | Seifert et al. .................. 235/380 |
| 2008/0041938 | A1 * | 2/2008 | Wise ............................ 235/380 |

FOREIGN PATENT DOCUMENTS

| | | |
|---|---|---|
| EP | 0 713 198 A2 | 5/1996 |
| EP | 0 823 694 A1 | 2/1998 |
| EP | 0 542 298 | 4/1998 |
| EP | 0 843 449 A2 | 5/1998 |
| EP | 0 914 001 A1 | 5/1999 |
| JP | 10-269291 A | 10/1998 |
| JP | 11-53184 A | 2/1999 |
| JP | 11-212785 A | 8/1999 |
| JP | 11-213010 A | 8/1999 |
| JP | 11-272762 A | 10/1999 |
| WO | WO 98/19237 A1 | 5/1998 |
| WO | WO 98/33343 | 7/1998 |
| WO | WO 98/37526 | 8/1998 |

* cited by examiner

DATA STORAGE AND ACCESS SYSTEMS

CROSS-REFERENCES TO RELATED APPLICATIONS

This application is a continuation of U.S. patent application Ser. No. 11/336,758, filed on Jan. 19, 2006; which is a continuation of U.S. patent application Ser. No. 10/111,716, filed on Sep. 17, 2002, which application is a national stage application under 35 U.S.C. 371, claiming the priority of international PCT Application No. GB00/04110, filed on Oct. 25, 2000; which claims priority to UK Application No. 9925227.2 filed on Oct. 25, 1999, each of which is incorporated by reference in its entirety for all purposes.

BACKGROUND OF THE INVENTION

This invention is generally concerned with data storage and access systems. More particularly, it relates to a portable data carrier for storing and paying for data and to computer systems for providing access to data to be stored. The invention also includes corresponding methods and computer programs. The invention is particularly useful for managing stored audio and video data, but may also be applied to storage and access of text and software, including games, as well as other types of data.

One problem associated with the increasingly wide use of the internet is the growing prevalence of so-called data pirates. Such pirates obtain data either by unauthorized or legitimate means and then make this data available essentially world-wide over the internet without authorization. Data can be a very valuable commodity, but once it has been published on the internet it is difficult to police access to and use of it by internet users who may not even realize that it is pirated. This is a particular problem with audio recordings, and, once the bandwidth becomes available, is also likely to be evident with video.

Over the past three or four years compressed audio sources have become increasingly widely available on web pages. One widely used audio data compression format is MP3 (MPEG-Audio Layer 3 of the MPEG1 compression algorithm), which is an internationally defined standard including a definition of compressed audio information such as speech or music. It relies on psycho-acoustic properties of human hearing to achieve very large data compression factors. It is thus feasible to download usefully long passages of music in a practically convenient short time. Pirate data suppliers have not been slow to realize the potential of this, and many unauthorized websites have sprung up offering popular industry considerable concern and there is an urgent need to find a way to address the problem of data piracy.

SUMMARY OF THE INVENTION

According to the present invention there is therefore provided a method of providing portable data comprising providing a portable data storage device comprising downloaded data storage means and payment validation means; providing a terminal for internet access; coupling the portable data storage device to the terminal; reading payment information from the payment validation means using the terminal; validating the payment information; and downloading data into the portable storage device from a data supplier.

Another aspect of the invention provides a corresponding mobile data retrieval device for retrieving and outputting data such as stored music and/or noise from the data storage device.

The payment validation means is, for example, means to validate payment with an external authority such as a bank or building society. The combination of the payment validation means with the data storage means allows the access to the downloaded data which is to be stored by the data storage means, to be made conditional upon checked and validated payment being made for the data. Binding the data access and payment together allows the legitimate owners of the data to make the data available themselves over the internet without fear of loss of revenue, thus undermining the position of data pirates.

A further advantage of the system is that it allows users under the age of 18 to make internet purchases. Currently internet users pay for goods and/or services by credit card. Since credit cards cannot legitimately be used by persons under the age of 18 (at least in the UK), a significant fraction of adventurous internet users are excluded from e-commerce, one of the most significant predicted uses of the internet. In one embodiment of the invention, however, the payment validation means comprises e-cash; that is, the payment validation means stores transaction value information on a cash value of transactions validatable by the data storage means. In simple terms, the data storage means can be a card which is charged up to a desired cash value (if necessary limited to a maximum value) at a suitable terminal. This might be an internet access terminal but could, more simply, be a device to accept the data storage card and to receive and count money deposited by the user to charge the card, writing update cash value information onto the card. More sophisticated ways of updating the cash value on the card are also possible, such as direct bank transfer. Since, with this type of embodiment, the data storage means is, essentially, precharged with cash rather than acting as a credit card, it can be used by young people without the risk of their incurring large debts.

In one embodiment the data storage means is powered by the retrieval device when it is connected to the device and retains a memory of the downloaded data when it is unpowered. This can be achieved by the use of Flash RAM or, more generally, any form of programmable read-only memory. Alternatively the data storage means may incorporate a rechargeable cell or capacitor and store information in battery backed-up static RAM.

The downloaded data may be entered into the data storage device by means of an interface such as a magnetically or capacitatively coupled connection or an optical connection, but preferably the interface comprises contacts for direct electrical connection to the storage means. The payment validation means may likewise have one of a variety of interfaces but again preferably comprises a set of electrical contacts. The payment validation means could, however, comprise a magnetic or holographic data-strip such as is known for use with credit cards and phone cards. The interface to receive the downloaded data may be separate from the interface to the payment validation means, to facilitate separate and simultaneous access to both these systems. In other embodiments a single interface may serve for both data storage and payment. Advantageously the payment validation means includes a memory storing information to identify the person who is paying for the downloaded data.

For additional security the downloaded data may be encrypted. In this case data decryption may be necessary at some stage, either in the data storage means or in the retrieval device or in an information delivering apparatus such as a data access terminal. Alternatively the data decryption function can be shared amongst one or more of these devices. The skilled person will be aware of a range of suitable encryption/decryption techniques, including Pretty Good Privacy (Registered Trade Mark) and PKI (Public Key Infrastructure). Normally when the downloaded data is encrypted a decryption key must be supplied. This can be generated automatically by the data access terminal or data access service provider or it can be entered by the user into the data access terminal or into the mobile data retrieval device.

The data storage means and/or the retrieval device can be provided with access control means to prevent unauthorized access to the downloaded data. Additionally or alternatively, use control means can be provided to stop or provide only limited access of the user to the downloaded data in accordance with the amount paid. These access and use control functions may in some embodiments be combined, permitted use controlling access or permitted access controlling use. Thus, for example, a complete set of data information relating to a particular topic, a particular music track, or a particular software package might be downloaded, although access to part of the data set might thereafter be controlled by payments made by a user at a later stage. In this way, a user could pay to enable an extra level on a game or to enable further tracks of an album.

In embodiments where the access or use control means is responsive to the payment validation means, access or use control information may be stored with the downloaded data or in a separate storage area, for example in the payment validation means. The user's access to the downloaded data could advantageously be responsive to the payment validation means, for example, by means of a control line coupling the payment validation means with a memory access or decryption control element.

In one embodiment the data storage means comprises an electronic memory card or smart card and the mobile data retrieval device is provided with a slot to receive the card. Preferably the card is a push-fit within the retrieval device, and retention of the card may be effected by pressure from electrical interface connections and/or resilience of the housing, or by using a resilient retaining means. In a preferred embodiment the retrieval device includes an audio output and a display, to play a downloaded track and to show information about the track and/or an accompanying video.

To download data onto the data storage means the user can employ a data access terminal coupled to the internet. The terminal can directly validate payment; for example in the case of a smart card charged with electronic cash it can deduct a cash value from the card. Alternatively it can communicate with a bank or other financial services provider to control payment. In a preferred embodiment, however, the terminal connects to a data access service provider which provides a portal to other sites and which validates payment and then forwards data from a data supplier to the user's local access terminal. The data access service provider may alternatively forward payment validation information and/or information from the payment validation authority to the data supplier for control by the supplier of the data supplied. Thus, access to the payment validation system and/or data for downloading may be entirely controlled by the data supplier.

Data held on the data storage means may advantageously include data relating to the user's or payer's usage of the system. This information may include, for example, information on a user's spending pattern, information on data suppliers used and information on the downloaded data. This information may be accessed by the data supplier and/or data access service provider and can be used for targeted marketing or loyalty-based incentive schemes such as air miles or the like.

The data access terminal may be a conventional computer or, alternatively, it may be a mobile phone. Wireless Application Protocol (WAP) and i-mode allow mobile phones to efficiently access the internet and this allows a mobile phone to be used to download data to the data storage means, advantageously, directly. The data storage means can, if desired, incorporate the functionality of a mobile phone SIM (Subscriber Identity Module) card, which cards already include a user identification means, to allow user billing through the phone network operator.

In a preferred embodiment the downloaded data is MP3 or other encoded audio data, but the system finds more general application for other data types. For example, download data can include software, and particularly games, share price information, current news information, transport timetable information, weather information and catalog shopping information. The downloaded information may also include compressed video data. The storage capacity of the data storage means is adaptable to suit the type of data intended to be downloaded; for example, 32 megabytes is sufficient for CD quality music, but for video it is preferable that the data storage means has a capacity of 128 megabytes or greater.

In another aspect, the invention provides a portable data carrier comprising an interface for reading and writing data from and to the carrier; non-volatile data memory, coupled to the interface, for storing data on the carrier; non-volatile payment data memory, coupled to the interface, for providing payment data to an external device.

These features allow the data carrier to store both payment data and content data, thus providing the advantages outlined above. Depending upon the payment system used, the payment data memory may also store code for validating or confirming a payment to an external payment system. The payment data will normally be linked to a card or card holder identification data for payment by the card holder. The non-volatile memory ensures that stored content and payment data is retained in the data carrier when the data carrier is not receiving power from an external source. Thus "non-volatile" encompasses, for example, low-power memory whose contents are retained by a battery back-up system. In one embodiment the payment data memory comprises EEPROM and the content data memory comprises Flash memory, but other types of content data memory, such as optical, for example, holographic, data memory can also be used. The data carrier may also be integrated into other apparatus, such as a mobile communications device.

Preferably, the portable data carrier further comprises a program store for storing code implementable by a processor; and a processor, coupled to the content data memory, the payment data memory, the interface and to the program store for implementing code in the program store, wherein the code comprises code to output payment data from the payment data memory to the interface and code to provide external access to the data memory.

Normally, the (content) data memory allows both write and read access for both storing and retrieving data, but in some embodiments the content data memory may be read-only memory (ROM). In such embodiments, content may be pre-loaded onto the carrier and payment may then be made for permission to access the pre-loaded data.

Preferably, the data carrier also stores a record of access made to the content data and updates this in response to external access, preferably read access, made to the data memory. The carrier may also store content use rules pertaining to allowed use of stored data items. These use rules may be linked to payments made from the card to provide payment options such as access to buy content data outright; rental access to content data for a time period or for a specified number of access events; and/or rental/purchase, for example where rental use is provided together with an option to purchase content data at the reduced price after rental access has expired.

Thus where the data carrier stores, for example, music, the purchase outright option may be equivalent to the purchase of a compact disc (CD), preferably with some form of content copy protection such as digital watermarking. In this example, the rental or subscription payment option may be a pay-per-play option, and with this option payment may either be before or after access to the stored data so that the carrier may operate in either a debit or credit payment mode.

The portability of the data carrier potentially allows it to be used to access content or, in the example, play music without the need to be linked to a communications system or to be on-line to the internet. By providing a use record memory on the data carrier, use of the stored data can be tracked while ff-line and then any necessary payment can be made when the data carrier is next coupled to a communication system. This allows the data carrier to operate in a credit mode. In a debit mode, the additional storage of use rules facilitates the regulation of access to content data stored on the carrier without the need for further exchange of payment/use data with an external system to validate the use.

By combining digital rights management with content data storage using a single carrier, the stored content data becomes mobile and can be accessed anywhere while retaining control over the stored data for the data content provider or data copyright owner. Preferably, the data carrier also stores access control data, such as a user ID and a password, as the stored data may be valuable. The access control data may be combined with access control to the payment data, which is typically by means of a PIN (Personal Identification Number) to simplify access to valued content stored on the carrier.

In one embodiment the stored content data is encrypted and a unique password or PIN and/or biometric data is required for decryption. The data carrier may be arranged so that the content is erased after a predetermined number of incorrect access attempts. Additionally or alternatively, a permanently stored flag may be set and/or a hardware modification (such as a fusable link) may be made to prevent the data carrier from functioning for further data storage/retrieval. Preferably, however, access to any stored value/payment data is nevertheless retained.

Supplementary data may also be stored on the carrier in association with stored content data. This supplementary data may comprise customer reward management data and/or advertising data. The supplementary data may comprise a pointer to an external data source from which data is downloaded either to the data carrier or to a data access device or content player, so that advertising or other data can be displayed when reviewing or accessing the stored content.

Additional data security and/or a mechanism for rewarding operators at different levels in the data supply chain may be provided using a content synthesis function. The content synthesis function combines partial content information from two or more sources to provide content data items for storage and/or output. Thus, for example, a first percentage of a content data item could be provided by a content retailer, while a remaining percentage could be provided by an on-line data supplier. This would provide an incentive for a user to register with a content retailer or distributor as well as with an on-line system owner and so could encourage the use of existing retailers and could provide a mechanism for paying commission to such retailers. The two portions of data combined to provide a content data item could comprise encryption data and a key but preferably comprise separate parts of a complete data item, for example, least significant bits and most significant bits or high frequencies and low frequencies (for audio). This arrangement also facilitates customer reward and loyalty management.

In one embodiment the data carrier further comprises memory for storing data for accessing a mobile communications network, for example to receive content data over the network. For such an embodiment, the data carrier may replace a SIM (Subscriber Identity Module) card in a mobile communications device, thus providing a single card for both network access and valued content retrieval and storage. Additionally or alternatively the card may also store the web address of a data supplier from whom data may be downloaded onto the carrier.

The data memory for storing content data may be optic, magnetic or semiconductor memory, but preferably comprises Flash memory. Preferably, the data memory has a large capacity for storing large data files such as compressed video data. Preferably, the data memory is partitioned for lock access, that is, for read and/or write access to blocks of, for example, 1 K, 4K, 16K or 64K databytes for faster data access, particularly where the stored content data will normally be accessed serially, as is normally the case with audio and video data. Preferably the card is configured as an IC card or smart card and has a credit card-type format, although other formats such as the "memory stick" format may also be used. This provides a small and convenient portable format and facilitates removable interfacing with a variety of devices.

The invention also provides a related method of controlling access to data on a data carrier, the data carrier comprising non-volatile data memory and non-volatile parameter memory storing use status data and use rules, the method comprising receiving a data access request; reading the use status data and use rules from memory; and evaluating the use status data using the use rules to determine whether access to the stored data is permitted.

According to another aspect of the invention, there is provided a computer system for providing data to a data requester, the system comprising a communication interface; a data access data store for storing records of data items available from the system, each record comprising a data item description and a pointer to a data provider for the data item; a program store storing code implementable by a processor; a processor coupled to the communications interface, to the data access data store, and to the program store for implementing the stored code, the code comprising code to receive a request for a data item from the requester; code to receive from the communications interface payment data comprising data relating to payment for the requested data item; code responsive to the request and to the received payment data, to read data for the requested data item from a content provider; and code to transmit the read data to the requester over the communications interface.

The computer system is operated by a data supplier or data supply "system owner" for providing content data to the data carrier described above. The payment data received may either be data relating to an actual payment made to the data supplier, or it may be a record of a payment made to an e-payment system relating either to a payment to the data supplier, or to a payment to a third party. The data from the content provider, preferably without permanent (local) storage of the forwarded data, improves data security as the content provider retains control over a content data item, and the data supplier, a copy of a data item, is unable to supply data for the item without the content provider's assistance. The computer system may provide temporary storage for a requested data item, for example using a disk cache, but preferably the computer system does not store a complete data item, even temporarily.

Preferably, the computer system includes payment distribution information so that when payment is made for a data item, the payment can be distributed for reimbursing royalties and making other payments. Typically a large fraction of the payment for a data item will be transferred to a copyright owner or "content provider" for the item while smaller payments will go to the artist and/or publisher and/or retailer/distributor. Payment may be made directly by the computer system to the computer systems of other relevant parties using, for example, a signature-transporting type e-payment system. Alternatively, the computer system can issue appropriate instructions to a third party e-payment system for making the transfers. The computer system allows automatic distribution of payments either before, during or after content data download, or after content data access by a user. Instructions for distributing the payments may be issued substantially simultaneously, thereby avoiding long delays in the payment of some parties; for example, it can presently take a year or more for an artist generating content to be paid by conventional methods.

Preferably, the computer system also stores content data item access rule data, for downloading in association with a content data item. The rule data may be stored by a content provider but is preferably held by the computer system, and links a content identifier with an access rule, typically based upon a required payment value, as outlined above in the context of the data carrier. Normally, each content data item will have an associated access rule, but a single rule may apply to a large number of data items. The computer system also, preferably, stores requester reward data for customer reward/loyalty management. This data may again comprise one or more rules linking a payment value and/or content data item type to a specified reward, such as a number of air miles or retailer value points. The computer system preferably also keeps a record of an identified user's or data's carriers content item downloads and payments for market research purposes.

The computer system, in one embodiment, also stores access control data, such as an access request identity and password which can be employed, for example, to create an extranet of system users, which again can be linked to stored access record data for marketing purposes. When further linked to content item type data, such an arrangement can be used to construct a club of users of content data items of a particular type, for example country and western or rock and roll music. As described in connection with the portable data carrier, the computer system may also comprise content synthesis code for additional data security and for more secure management of payment distributions.

The invention also provides a related method of providing data to a data requester comprising receiving a request for a data item from the requester; receiving payment data from the requester relating to payment for the requested data; reading the requested data from a content provider responsive to the received payment data; and transmitting the read data to the requester.

According to a further aspect of the present invention, there is provided a data access terminal for retrieving data from a data supplier and providing the retrieved data to a data carrier, the terminal comprising a first interface for communicating with the data supplier; a data carrier interface for interfacing with the data carrier; a program store storing code implementable by a processor; and a processor, coupled to the first interface, the data carrier interface and to the program store for implementing the stored code, the code comprising: code to read payment data from the data carrier and to forward the payment data to a payment validation system; code to receive payment validation data from the payment validation system; code responsive to the payment validation data to retrieve data from the data supplier and to write the retrieved data into the data carrier.

This terminal can be used for retrieving data from the above-described computer system and for downloading the retrieved data to the above-described portable data carrier. As with the data supply computer system, it is preferable that there is no (local) storage of content item data forwarded from the data supplier to the data carrier. The data access terminal is not restricted to use with the above-described status supplier and could, for example, retrieve data for downloading to the data carrier from a local data source, such as a CD (Compact Disc) or DVD (Digital Versatile Disc), or from a third party such as a cable TV company.

The terminal reads payment data from the data carrier and transmits this to a payment validation system for validating the data and authorizing the payment. This may be part of the data supplier's computer system or it may be a separate system such as an e-payment system. Thus, the terminal operates with a data carrier storing payment (validation) data and, in some embodiments, additional payment validation code for validating payment to the payment validation system. Again, the terminal is preferably configured to provide a data item use rule to the carrier in conjunction with a data item. As before, the data item use rule will normally be dependent upon payment value information embodied in the payment data read from the data carrier. The terminal is preferably also configured for user input of access control data. This access control data may be forwarded to the data carrier for access permission verification and/or it may be passed to the data supplier computer system for a similar purpose. The terminal may be configured to warn a user of content access or data carrier function inhibition after a predetermined number of access requests have been refused. The terminal may also incorporate content synthesis code as described above.

The terminal may comprise code to output supplementary data when downloading data to the data carrier. Identity data on the data carrier can be used to retrieve the supplementary data, or a pointer to the supplementary data, from the data supplier computer system, or the supplementary data or a pointer thereto can be retrieved directly from the data carrier. Preferably, however, identification data on the card is used to retrieve characterizing data such as card user preference data from the data supplier computer system, and this characterizing data is then used by the terminal to retrieve and output supplementary data to a terminal user. When the terminal is associated with a contact distributor or retailer, the supplementary data may be retrieved over a network associated with the retailer/distributor such as a local area network (LAN), wide area network (WAN) or extranet.

The invention also provides a method of providing data from a data supplier to a data carrier, the method comprising reading payment data from the data carrier; forwarding the payment data to a payment validation system; retrieving data from the data supplier; and writing the retrieved data into the date carrier.

The payment validation system may be part of the data supplier's computer systems or it may be a separate e-payment system. In one embodiment the method further comprises receiving payment validation data from the payment validation system; and transmitting at least a portion of the payment validation data to the data supplier. Alternatively the payment validation system may comprise a payment processor at the data supplier or at a destination retrieved from the data supplier. The payment processor may also provide payment distribution data for distributing a payment represented by the payment data.

In a further aspect, the invention provides a data access device for retrieving stored data from a data carrier, the device comprising a user interface; a data carrier interface; a program store storing code implementable by a processor; and a processor coupled to the user interface, to the data carrier interface and to the program store for implementing the stored code, the code comprising code to retrieve use status data indicating a use status of data stored on the carrier, and use rules data indicating permissible use of data stored on the carrier; code to evaluate the use status data using the use rules data to determine whether access is permitted to the stored data; and code to access the stored data when access is permitted.

The data access device uses the use status data and use rules to determine what access is permitted to data stored on the data carrier. As described above, the use rules will normally be dependent upon payments made for data stored on the data carrier, but may also comprise access control employing a user identification and password. Since a single data carrier may have more than one user, the use status and use rules may be selected dependent upon a user identity. The data access device may also be configured to present supplementary data when presenting the content data, retrieved as described above, from the card, from a remote computer system or from some other source such as a cable TV network or off-air.

The invention also provides a related method of controlling access to data from a data carrier, comprising retrieving use status data from the data carrier indicating past use of the stored data; retrieving use rules from the data carrier; evaluating the use status data using the use rules to determine whether access to data stored on the carrier is permitted; and permitting access to the data on the data carrier dependent on the result of said evaluating.

According to a further aspect of the invention there is provided a data access system comprising a data supply computer system for forwarding data from a data provider to a data access terminal; a electronic payment system for confirming an electronic payment; a data access terminal for communicating with the data supply system to write data from the data supply system onto a data carrier; and a data carrier for storing data from the data supply system and payment data; wherein data is forwarded from the data provider to the data carrier on validation of payment data provided from the data carrier to the electronic payment system.

In a further aspect of the invention, there is provided a portable data carrier comprising an interface for sending and receiving data from and to the carrier; non-volatile data memory, coupled to the interface, for storing data on the carrier; and a digital rights management processor for controlling access to the stored data.

In a further aspect of the invention, there is provided a portable data carrier comprising an interface for sending and receiving data from and to the carrier; non-volatile data memory, coupled to the interface, for storing data on the carrier; and an access control processor; wherein the data memory is partitioned as data blocks and the access control processor controls external access to the data blocks.

In a further aspect of the invention, there is provided a computer system for providing data to a data requester, the system comprising a communication interface; a data access data store for storing records of data items available from the system, each record comprising a data item description and a resource locator; a data provider for the data item; a program store storing code implementable by a processor; a processor coupled to the communications interface, to the data access data store, and to the program store for implementing the stored code, the code comprising code to receive a request for a data item from the requester to receive from the communications interface payment data comprising data relating to payment for the requested data item; code, responsive to the request and to the received payment data, to output the item data to the requester over the communication interface; wherein said data access data store further comprises payment distribution information indicating to whom payments should be made for a data item; and further comprising code to output payment data for a data item for making payments for the item when the item is supplied to a requester.

In a further aspect of the invention, there is provided a computer system for providing data to a data requester, the system comprising a communication interface; a data access data store for storing records of data items available from the system, each record comprising a data item description and a printer location data identifying an electronic address for a provider for the data item; a program store storing code implementable by a processor; a processor coupled to the communications interface, to the data access data store, and to the program store for implementing the stored code, the code comprising code to receive a request for a data item from the requester to receive from the communications interface payment data comprising data relating to payment for the requested data item; code responsive to the request and to the received payment data to output the item data to the requester over the communication interface; wherein the data access data store further comprises data item access rule data for output to the requester with a data item; and further comprising code to select access rule data for output with a data item in response to the payment data.

In a yet further aspect of the invention, there is provided a method of providing data to a data requester comprising receiving a request for a data item from the requester; receiving payment data from the requester relating to payment for the requested data; transmitting the requested data to the requester; reading payment distribution information from a data store; and outputting payment data to a payment system for distributing the payment for the requested data.

In a still further aspect of the invention, there is provided a method of providing data to a data requester comprising receiving a request for a data item from the requester; receiving payment data from the requester relating to payment for the requested data; transmitting the requested data to the requester; and transmitting data access rule data to the requester with the read data.

These and other aspects of the invention will now be further described, by way of example only, with reference to the accompanying figures.

DESCRIPTION OF THE PREFERRED EMBODIMENTS

Figure 1:
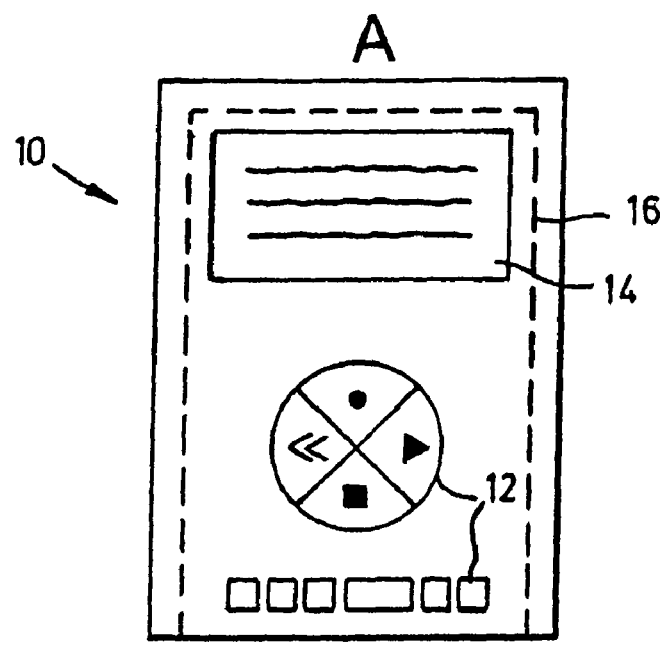
FIG. 1 shows a data access device a) from the top; b) from the front; and c) from the side.
Figure 1:
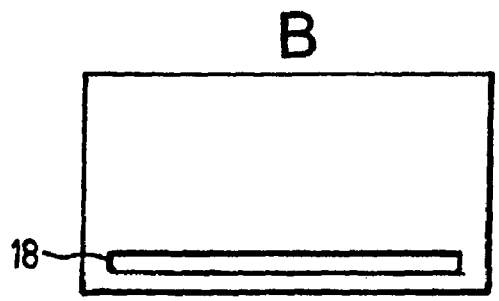
Figure 1:
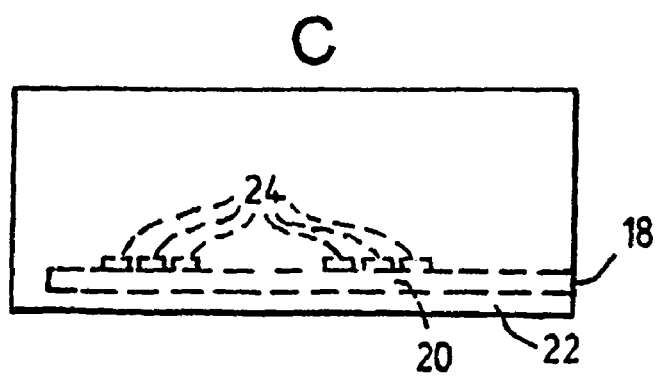

Referring to FIG. 1, this shows a data access device for playing MP3 audio (10) with operator controls (12) and LCD display (14). The outline of a smart card data storage device is shown at (16). The operator controls allow a user to select and play tracks, while track information and still or video images are provided on display (14). A slot (18) is provided in the front of the device to receive a smart card-type data storage means. This smart card occupies space (20) and interfaces with resilient contacts (24); it is held in the data retrieval device against the contacts, by resilient housing element (22).

Figure 2:
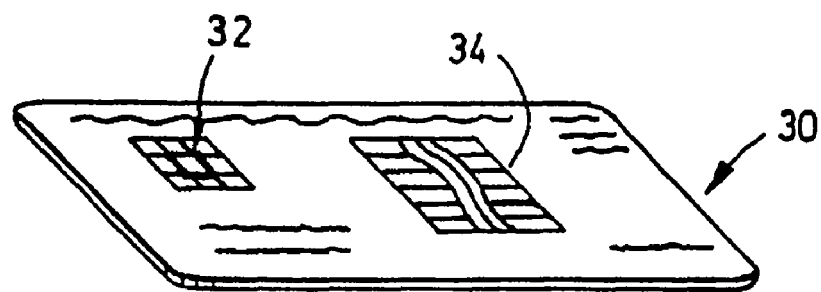
FIG. 2 shows, conceptually, a portable data carrier.

Referring now to FIG. 2, this shows a portable data carrier (30) suitable for use with the device of FIG. 1. The data storage means is based on a standard smart card; it is plastic, about the size of a standard credit card, and has some flexibility. On the card (30) are two sets of contacts, contacts (32) for interfacing with the payment validation means and contacts (34) for interfacing with the memory for storing downloaded data (although in other embodiments, a single set of contacts may be used for both). The surface of the card can be embellished with suitable graphics.

In one embodiment the smart card retains all its useable functionality as specified for standard Electronics Point of Sale Systems (EPOSS) and, if desired, the memory for storing the downloaded data can be electrically separate from this. However, it may be preferable to provide interaction between the standard smart card device and the data memory in order to accomplish the access control/decryption functions described above.

Figure 3:
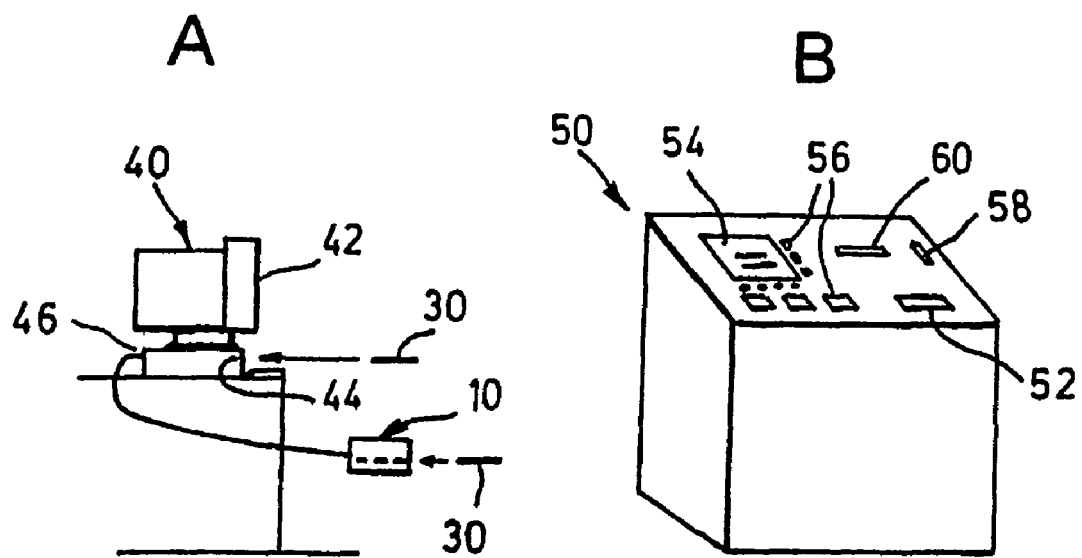
FIGS. 3a and b show exemplary data access terminals.

Referring now to FIG. 3, an example of a data access terminal is shown at (40). This has a screen (42) and a slot (44) to receive the data carrier (30). Alternatively the data carrier may interface to the terminal via the data access device (10) and an interface (46) to the terminal (40). In FIG. 3b a dedicated terminal (50) has a slot (52) to receive the data carrier, a display (54) and controls (56). Coins can be inserted into the terminal at (58) and notes at (60) to charge the data carrier with cash.

Figure 4:
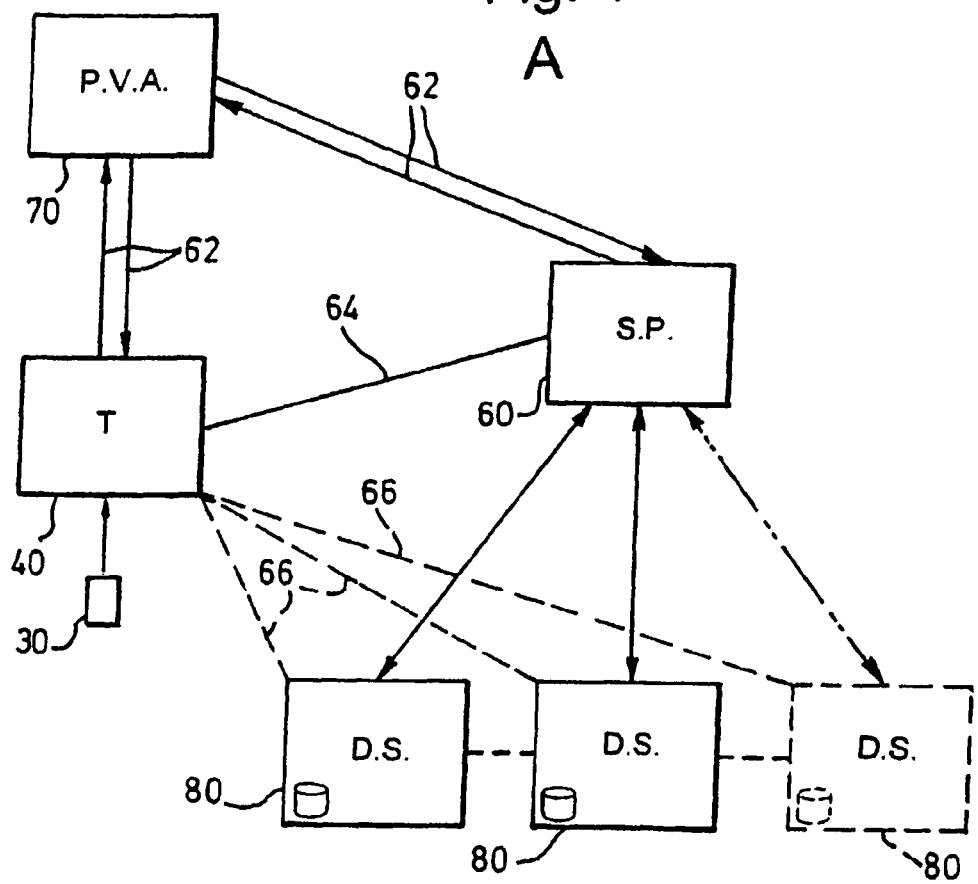
FIGS. 4a and b show, respectively, a logical signal path between elements of a conceptual data access system; and a physical representation of a conceptual data access system.
Figure 4:
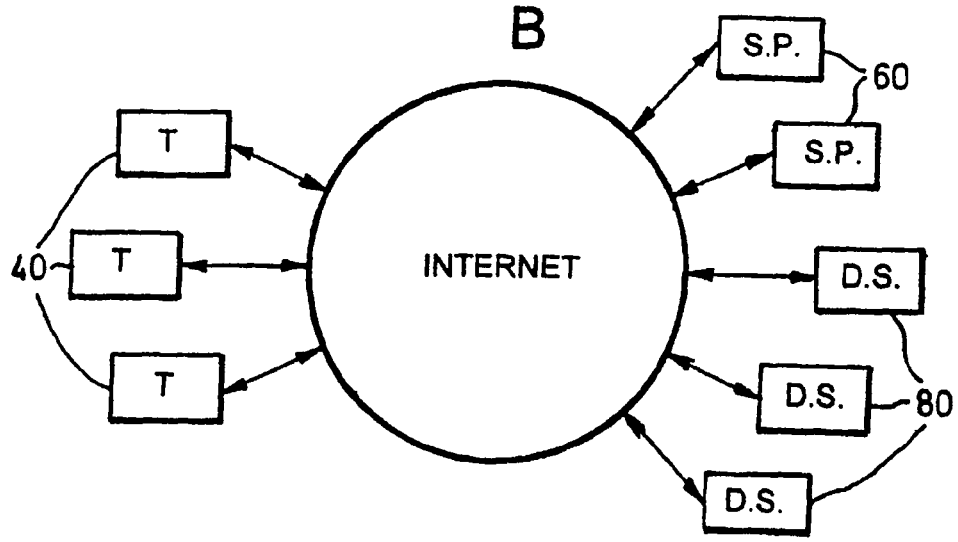

Referring now to FIG. 4a, this illustrates conceptually the logical connections and data flow between data processing systems involved in payment validation, and data download to the carrier (30). A user connects the data carrier (30) to terminal (40) and logs on to a data web page of data supply service provider (60). Either terminal (40) or service provider (60) then communicates via data paths (62) with a payment validation authority (70) to check and authorize the user's or payer's payment. In the case of electronic cash the terminal (40) may immediately validate the payment information, updating the service provider and/or payment validation authority (70) at a later stage. The logical connection (64) between the terminal and the service provider is preferably made over the internet.

The service provider may provide a direct portal to data providers (80) or may collect information from data suppliers (80) and provide a "front end" to present data from the suppliers to the terminal user. Alternatively, data supply service provider (60) may regulate direct access between terminal (40) and data providers (80), as shown by links (66), by communicating with the terminal and the data providers to provide communication regulation information to, for example, instruct data suppliers about what information the user of terminal (40) should have access to.

In a preferred embodiment, service provider (60) pays royalties at an agreed rate—for example, 10 pence per track or 10 pence per minute—to a computer system owned by a company or entity in the recording industry, such as a content provider or copyright owner, a content publisher or a content creator, and the user of terminal (40) effectively pays the service provider. Billing can also be regulated by bandwidth and/or data download time.

Preferably the service provider (60) monitors the user's access to the system and either stores or forwards to data providers (80), or downloads to the data carrier (30), usage information. In a preferred embodiment the service provider sends information via terminal (40) to data carrier (30) which can be used to determine incentives to be provided to users of the system.

FIG. 4b shows a conceptual physical configuration of the system of FIG. 4a in which a plurality of terminals (40), a plurality of service providers (60) and a plurality of data providers (80) all interact via the internet. The physical embodiment of the system is not critical and a skilled person will understand that the terminals, data processing systems and the like can all take a variety of forms.

Figure 5:
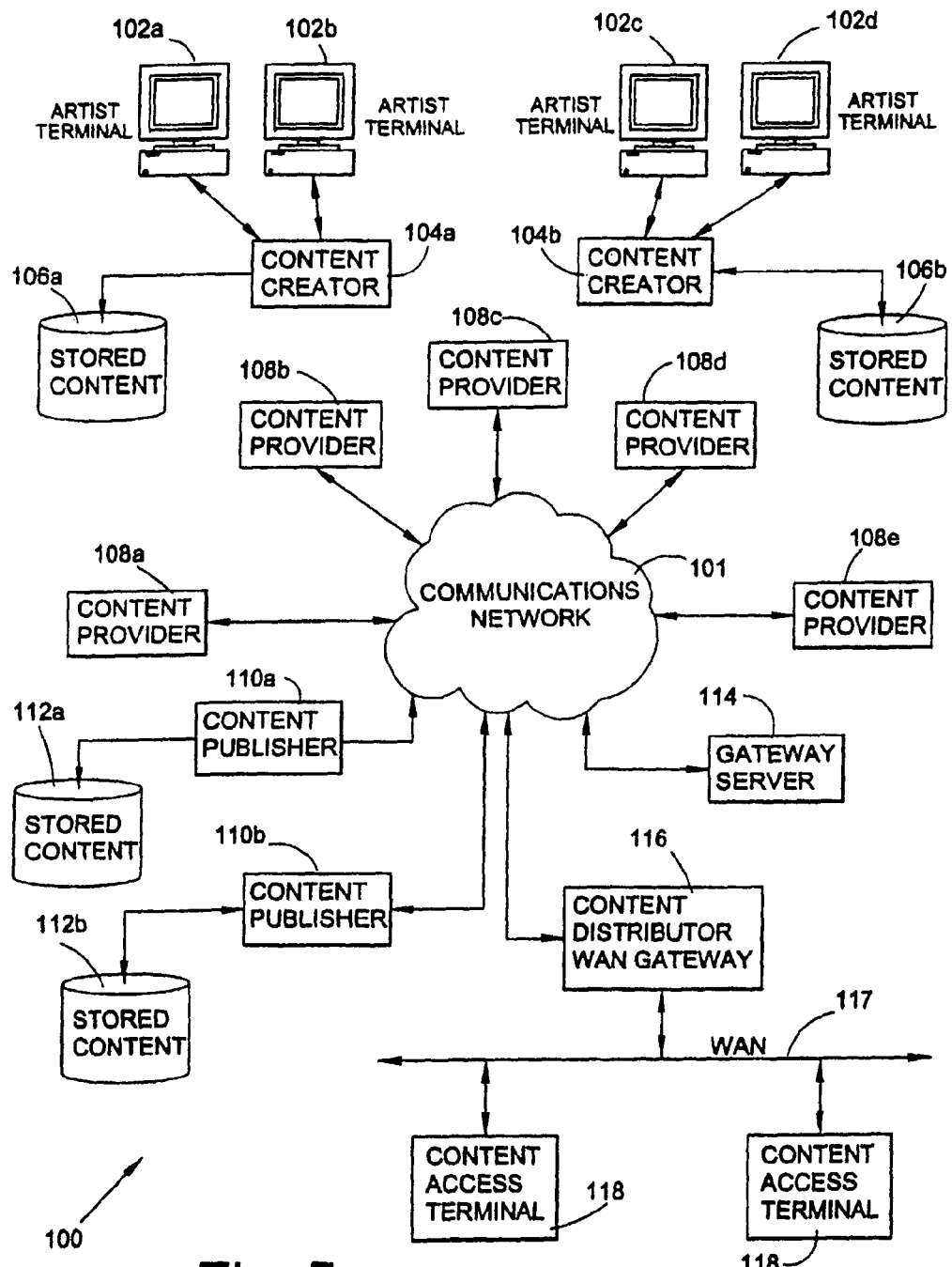
FIG. 5 shows a content provision system.

Referring now to FIG. 5, this shows a conceptual illustration of a content provision system 100. Content creators 104a, b generate or receive content data from artist terminals 102a-d and store content data in databases 106a, b. The content data stored in databases 106a, b may comprise audio data, such as music, video data, such as films or TV programs, text, such as literary works, software, such as games software, or other data. Content creators 104a, b are coupled to communications network 101 for communicating created content data over the network. Also coupled to communications network 101 are content publishers 110a and 110b, each of which is coupled to an associated stored content database, 112a and 112b respectively. The content publishers make their stored content available for controlled access using communications network 101. In some instances, for example where the content data comprises computer games, the functions of content creator and content publisher may be provided by a single entity. Also although conceptually illustrated as blocks in FIG. 5, the content creator and content publisher typically each comprise a client server computer network.

The communications network 101 is typically a private communications network, such as an extranet, with security controlled access to entities connected to the network. Physically the network may comprise an internet protocol network or it may comprise, or consist of, dedicated point-to-point links. Thus, for example, a content creator 104 may be directly linked to a content publisher 110 and/or to other entities shown in FIG. 5 such as a content provider or content distributor.

The content provision system includes a plurality of content providers 108a-e, each coupled to the communications network 101. In the illustrated system, the content provider's own copyright in stored content data accessible over communications network 101 and may, in practice, also perform a content publication function. Five content providers own the copyright in over 80% of all world-wide music sales. The content providers are coupled to stored content databases 106 and 112 via communications network 101, for supplying stored content data.

A gateway server 114 is also coupled to communications network 101 to link the communications network to other networks such as the internet and/or mobile communications networks. Gateway server 114 provides security and access control functions and firewalls. A second gateway, content distributor WAN gateway 116, is also shown attached to communications network 101. This provides similar security and firewall functions and coupled communications network 101 to distributor WAN (wide area network) 117. Gateway 116 has logical access to one or more of a content creator, content publisher and content provider for accessing stored content data. Content distributor gateway 116 may be owned by a chain of record stores and provide content access terminals 118, coupled to WAN 117, in separate retail outlets. Content access terminals 118 have access, via gateway 116, to stored content accessible over communications network 101.

Figure 6:
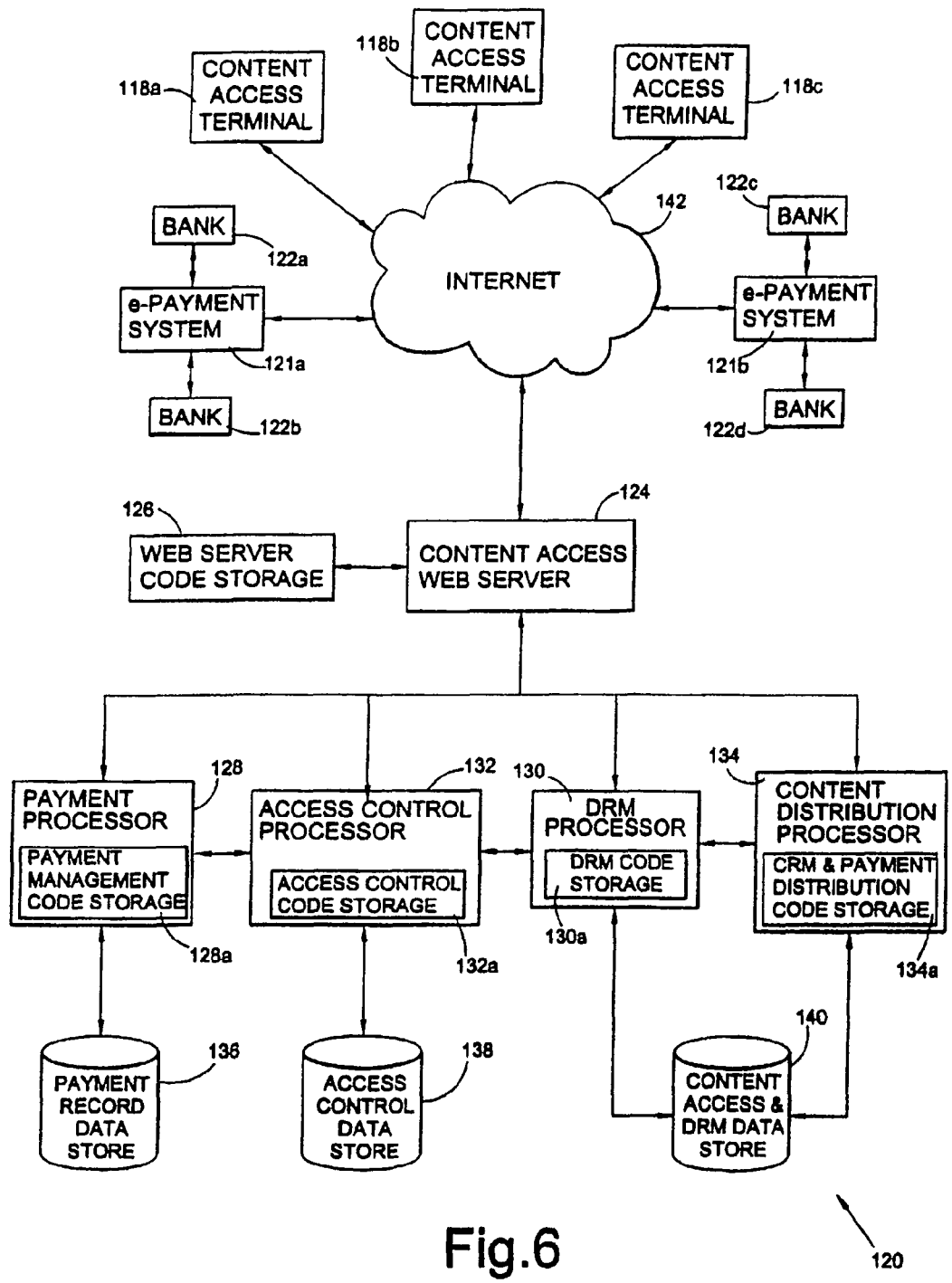
FIG. 6 shows a data supply computer system.

Referring now to FIG. 6, this shows a data supply computer system 120. In this embodiment, three content access terminals 118*a-c*, e-payment systems 121*a, b*, and content access web server 124 are all coupled to internet 142. Data supply system 120 is coupled to the content provision system 100 illustrated in FIG. 5. Where communications network 101 of FIG. 5 is an extranet, this extranet physically operates over internet 142; where communications network 101 does not partly operate via internet 142, a connection to internet 142 is established via gateway server 114 as shown in FIG. 5. In this way content access terminals 118*a-c* are provided with controlled access to the stored content data of content provision system 100.

E-payment systems 121*a* and 121*b* are coupled to banks 122*a, b* and *c*, d respectively. These provide an e-payment system according to, for example, MONDEX, Proton, and/or Visa cash compliant standards. Preferably at least one of e-payment systems 121*a, b* operates a so-called "open purse" system in which the value is stored as a publicly verifiable digital signature issued by the e-payment system. In such a signature-transporting arrangement, payment data may be validated using public keys and thus payment authentication need not be performed by the e-payment system but may instead be performed by, for example, a data access terminal or data supply system computer, using payment management code. The authenticated signatures, which in effect perform a similar role to checks, are submitted to the relevant e-payment system after authentication for verification and reimbursement or transfer of monetary value. With such a system payments may be made anonymously and thus payer identification is not essential. Data carriers, such as data cards, may be issued with stored value or without value, in which latter case value (that is, a publicly verifiable digital signature) may be written onto the card during an on-line transaction.

In alternative embodiments, a data carrier such as the smart Flash card described below may be used to create value bearing digital signatures as is well-known to those familiar with e-money.

Content access web server 124 is also coupled to internet 142 for providing content access terminals 118*a-c* with access to content data. Content access web server 124 is typically owned by a content data supply "system owner" who acts as an intermediary between a content access terminal user and a content provider, forwarding content data provided (directly or indirectly) by a content provider to a content access terminal and then to a stored content data carrier.

Web server 124 is coupled to web server code storage 126 storing Java code for generating web pages for interpretation by web browsers on content access terminals 111*a-c*. The web pages provide the content download, value add, CRM (customer reward management) value check/spend and website link functions described below.

Web server 124 is coupled to payment processor 128, Digital Rights Management (DRM) processor 130, access control processor 132, and content distribution processor 134. Payment processor 128 includes payment management code storage 128*a* and is coupled to payment record data store 136. Access control processor 132 includes access control code storage 132*a* and is coupled to access control data store 138. DRM processor 130 includes DRM code storage 130*a* and is coupled to content access and DRM data store 140. Content distribution processor 134 includes CRM (customer reward management) and payment distribution management code storage 134*a* and is also coupled to content access and DRM data store 140. As shown in FIG. 6, processors 128-134 are all in communication with one another.

Processors 128, 130, 132 and 134 may comprise separate application programs or a single computer program and may operate on a single physical computer, on which web server 124 may also be provided, or may operate on separate computers. Likewise data stores 136, 138 and 140 may comprise a single physical data store or may be distributed over a plurality of physical devices and may even be at physically remote locations from processors 128-134 and coupled to these processors via internet 142.

Web server 124 communicates with processors 128-134 by means of a CGI (common gateway interface) script and the code associated with processors 128-134 may be written in any conventional computer language such as C, C++, or Perl. However, in other embodiments one or more of the processors may be coupled to web server 124 via internet 142 and owned and operated by a separate entity, such as a financial institution. In this case conventional secure web-based communications may be operated between web server 124 and the relevant processor. In particular, payment processor 128 may be operated by one of the e-payment system providers 128*a, b*.

Payment management code 128*a* issues and authenticates payment data and stores an audit record in payment record data store 136. Access control code 132*a* stores identification data (of a user or card) together with registration data provided by a user when registering with the system owner. This data comprises a user password for accessing stored content and/or payment data; user characterizing data, for example characterizing user preferences, for marketing purposes; data indicating an e-payment system to use; and in some embodiments, further general user related data such as card level data for identifying the provision of "gold" level services to selected users. A copy of the password is stored with the content data on the portable data carrier, as described further below. Alternatively, one or both of the access control data store and portable data carrier may simply store data for verifying a user-entered password.

Content access and DRM data store 140 stores data related to content access and content use, but does not itself store content data items; these are instead provided via content provision system 100 described above. Data store 140 stores a plurality of records each comprising a data item identifier, a data item description, a data item type or genre, and location data comprising one or more pointers to a location or locations from where the data item can be downloaded. Associated with a data item is also a table of use rule data comprising a list of values (i.e. content data item prices) and corresponding levels of permitted usage. Thus a value of £1 might permit ten plays of a music track, while the value of £10 might permit an unlimited number of plays of the track and copying of the track for personal use.

Also associated with a data item is a table of payment distribution data comprising a list of recipients and corresponding fractions of the data item value each is to receive. Typically, the main recipient will be the copyright owner of the data item and other recipients will be selected from the content creator, the artist or artists, the system owner, the content publisher, and the retailer/distributor. The payment distribution proportions may be dependent upon the payment value, in which case a plurality of sets of payment distribution figures may be associated with each data item, each set of distribution figures corresponding to a payment value range. The payment data and distribution data is here termed DRM (Digital Rights Management) data.

Further associated with a data item is a table of CRM (Customer Reward Management) data, linked to the user rule data, comprising CRM rules to specify, for one or more data item use levels, a quantity of reward points and one or more recipients for the reward points (the recipients may include the card user and the retailer/distributor).

The CRM and payment distribution code 134a operates with content access and DRM data store 140 to inform a system user of the description and value of a data item, to access and download a data item from the content provider system to a content access terminal, to provide content use rules with the data item, and to provide instructions either to payment processor 128 or to e-payment system 121 to distribute payments for the data item to the recipients identified by the data store 140 and to distribute CRM reward points.

The access control data store 138 holds a secure key, such as a secret "public" key in a public key cryptography system, for the system owner to authenticate its identity to a content provider. This data is held securely with other sensitive data in the access control data store 138. As is described in more detail below, when data supply system 120 receives a request for a content data item from a content access terminal 118, it looks up a location from which the data item is available using content access and DRM data store 140 and then determines the identity of the corresponding content provider. This identity is either stored in content access and DRM data store 140 or, as there are relatively few content providers, it may be hard written in DRM code 130a. DRM code 130 then requests access control processor 132 to provide the secure system owner identifier from access control data store 138 to the relevant content provider and sets up a trusted connection between the content provider and content access web server 124 for downloading the data item to a content access terminal 118 and then to a portable data carrier.

Figure 7:
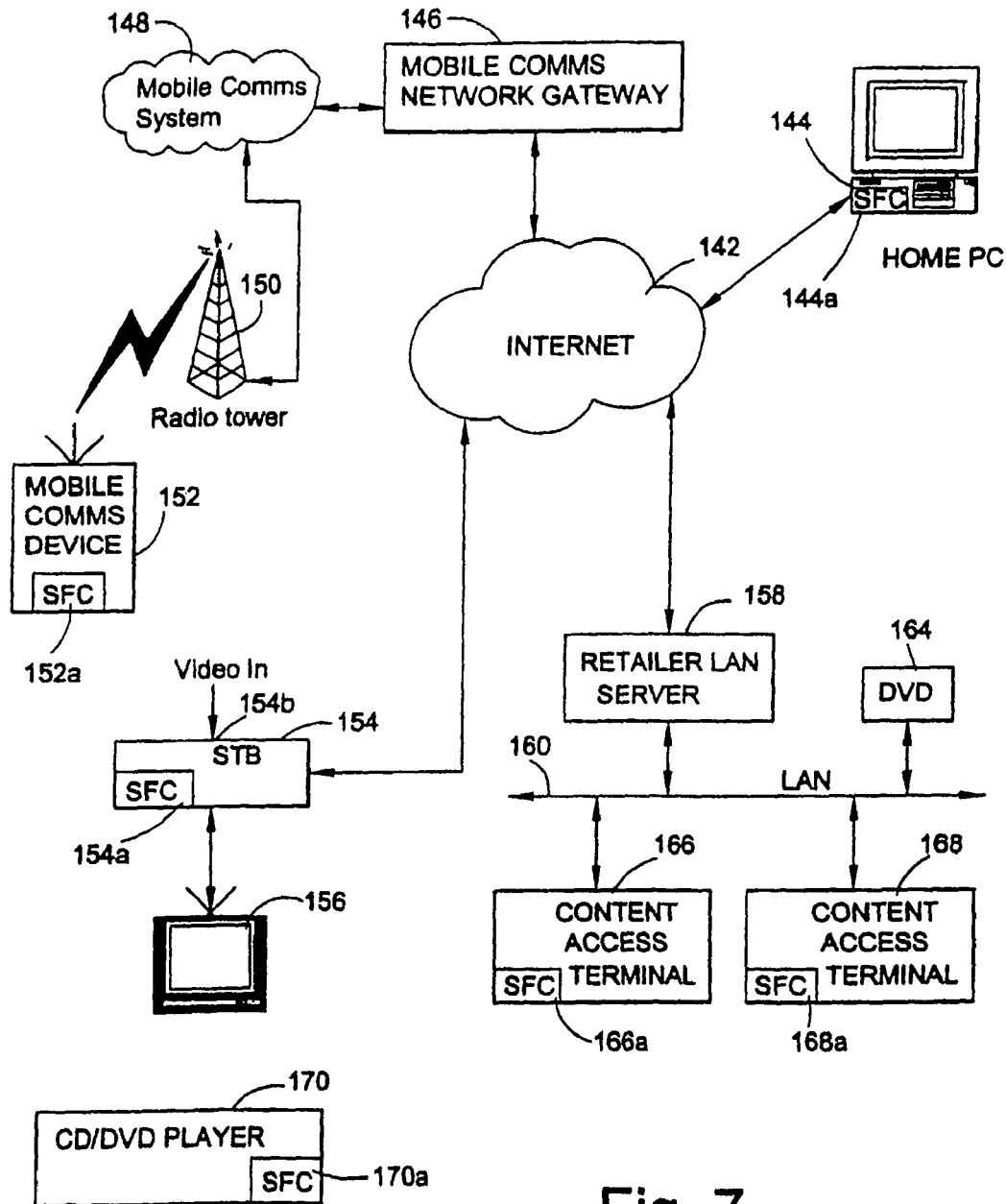
FIG. 7 shows a variety of data access terminals.

Referring now to FIG. 7, this shows a variety of content access terminals for accessing data supply computer system 120 over internet 142. The terminals are provided with an interface to a portable data carrier or "smart Flash card" (SFC) as generally described with reference to FIG. 2 and as described in more detail below. In most embodiments of the terminal the SFC interface allows the smart Flash card data carrier to be inserted into and removed from the terminal, but in some embodiments the data carrier may be integral with the terminal.

Referring now to the specific embodiments illustrated in FIG. 7, a simple content access terminal may comprise a home personal computer 144 with SFC interface 144a. In another embodiment, a mobile communications device 152 is provided with a smart Flash card interface 152a and is coupled to internet 142 via radio tower 150, mobile communications system 148 and mobile communications internet gateway 146.

In another embodiment, a smart Flash card interface is provided to a so-called "set top box" (STB) 154. The set top box is, in effect, a receiver for television programs received on video input 154b, which may comprise a satellite TV signal, a cable TV signal or an off-air TV signal. The video signal is provided from the set top box to television 156 or to some other home entertainment device such as a personal computer (not shown). In another embodiment, content access terminals 166 and 168 each with respective SFC interfaces 166a and 168a are coupled to a retailer local area network (LAN) 160 connected to internet 142 via retailer LAN server 158. DVD player 164 is also coupled to LAN 160. In a further embodiment a smart Flash card interface 170a is provided for a CD/DVD player 170.

In these latter three embodiments, content data for storage on the smart Flash card may be retrieved from broadcast video and/or a CD or DVD. In this case, the computer data supply system 120 illustrated in FIG. 6 may be used to provide use rule data for the content data stored on the smart Flash card, and to pay for data downloaded onto the card; the content data may be captured before or after the data supply system 120 is accessed to enable use of the stored data, but in a preferred embodiment content data written to the card from a supplier other than the content data supply computer system is not accessible to a user until corresponding use rule data has been downloaded from computer system 120, which will normally be after receiving payment for the downloaded data.

Figure 8:
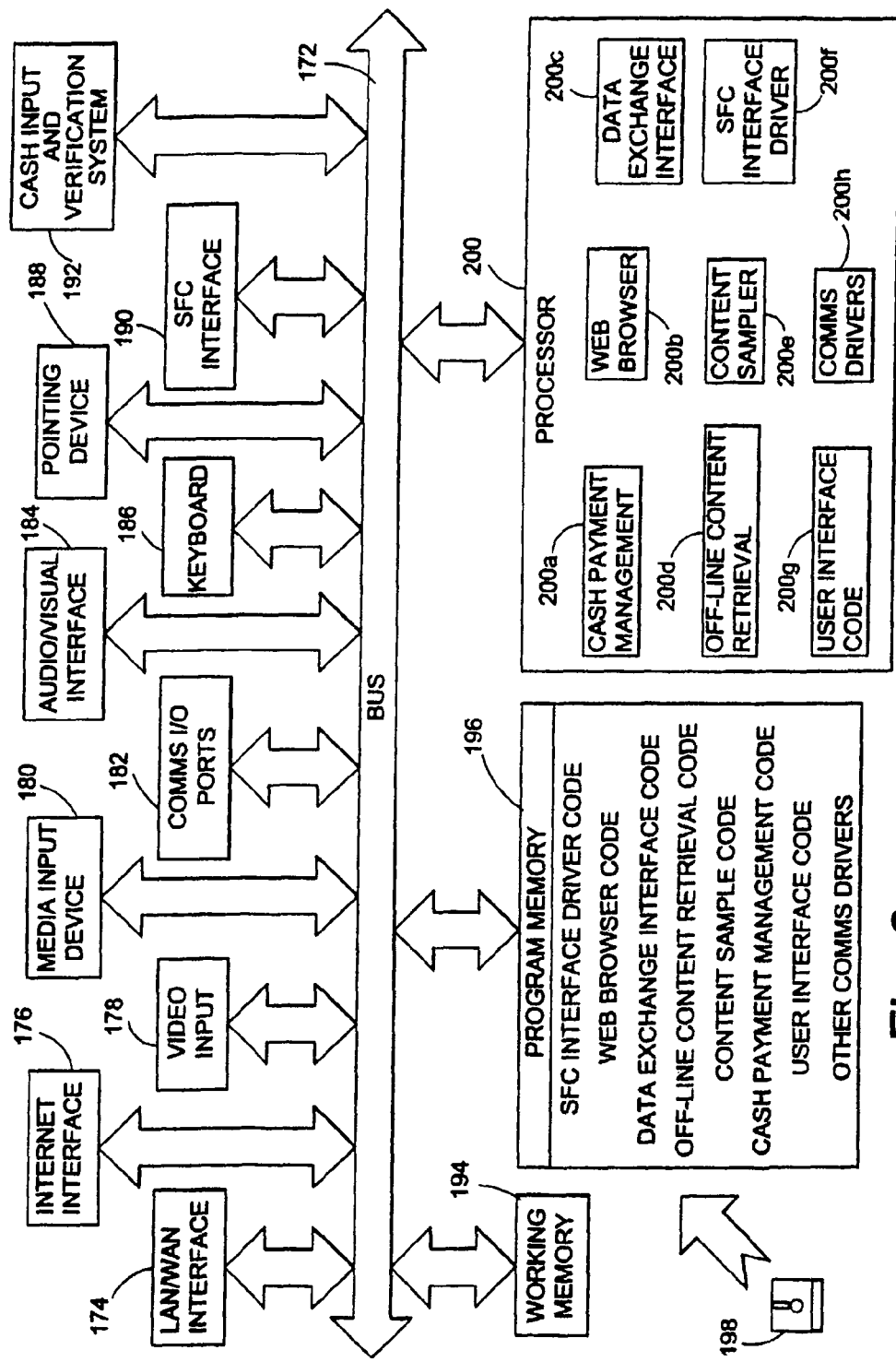
FIG. 8 shows a schematic diagram of components of a data access terminal.

Referring now to FIG. 8, this shows a schematic diagram of one embodiment of a data access terminal 170. The terminal comprises a general purpose computer including an audio/visual interface 184, a keyboard 186 and a pointing device 188 for providing an interface to the user. The terminal has an internet interface 176, for example a modem, and optionally a LAN/WAN interface 174 for connecting the terminal to a retailer or distributor LAN or WAN. The terminal also has an optional video input 178 for receiving broadcast video data and a media input device 180, such as a CD or DVD drive. Further communications I/O ports 182 may also be provided. A portable data carrier or smart Flash card interface 190 is provided for interfacing to a smart Flash card. Optionally, a cash input and verification system 192, such as is conventionally used in an automatic teller machine (ATM), may also be incorporated within the content access terminal. The terminal has working memory 194 such as RAM and program memory 196 which can comprise any conventional storage device such as RAM, ROM or a disk drive. Program code in program memory 196 may also be stored on removable disk 198. A processor 200 loads and implements program code stored in program memory 196. All the components of the terminal are linked by a data and communications bus 172.

More specifically, processor 200 loads and implements cash payment management code 200a for managing cash input data from cash input and verification system 192, for adding value to a smart Flash card. Processor 200 also implements a web browser 200b for accessing system owner web pages and data exchange interface 200c for exchanging data between a smart Flash card interface to the terminal and data supply system 120.

Processor 200 also implements off-line contents retrieval code 200d for retrieving data for storage on a smart Flash card from media input device 180 and/or video input 178 and/or LAN/WAN interface 174. The processor implements a content sampler 200e for outputting small extracts of content data items to a user via audio/visual interface 184. Such data item samples may be stored with the content description data in content access data store 140. The processor also implements a smart Flash card interface driver 200f, user interface code 200g and additional communication drivers 200h for driving LAN/WAN interface 174 and/or comms I/O ports 182.

Figure 9:
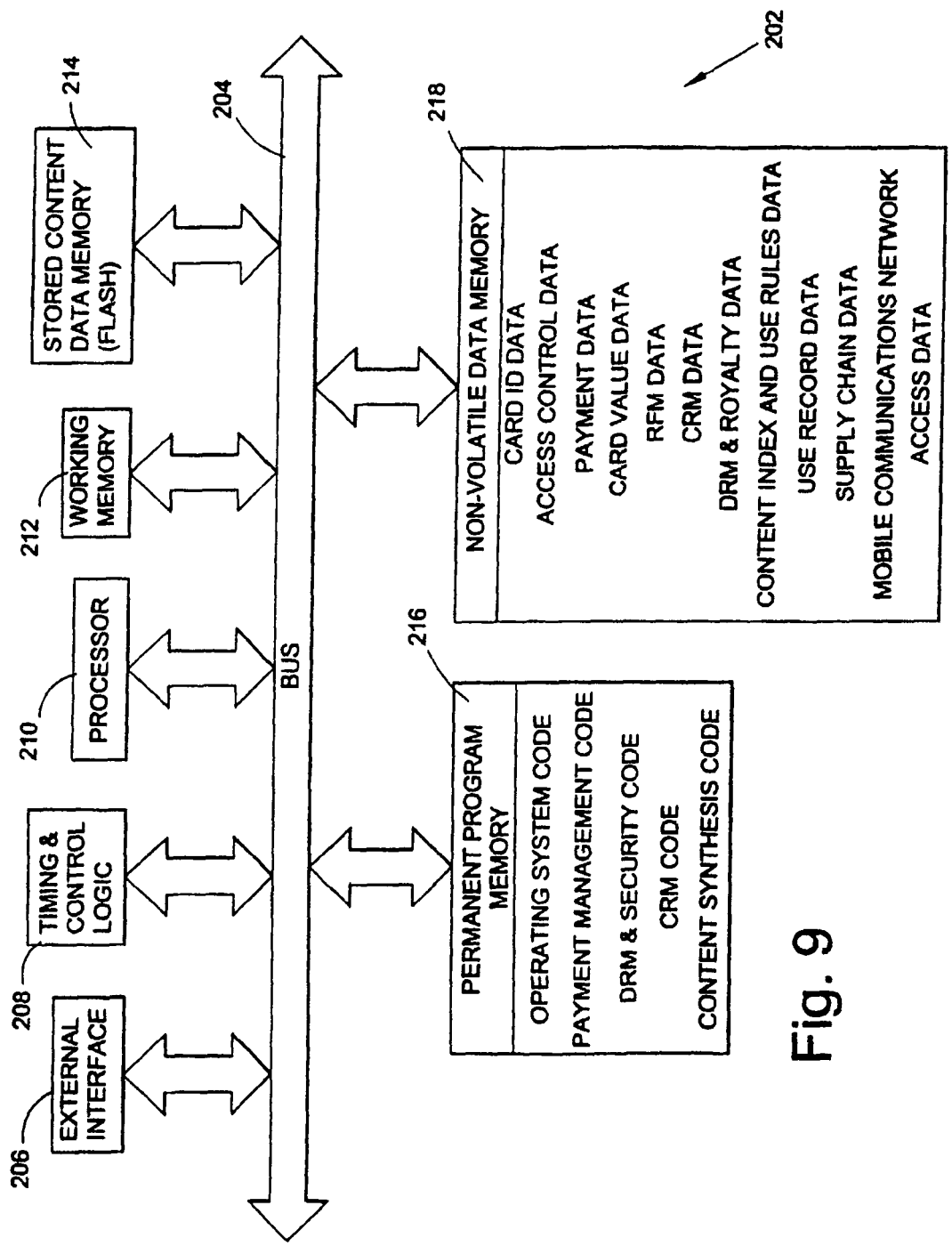
FIG. 9 shows a schematic diagram of components of a data carrier.

Referring now to FIG. 9, this shows a schematic diagram of components of a portable data carrier 202, in the embodiment shown a so-called "smart Flash card". In this context, "smart Flash card" refers to an IC card similar in size to a plastic payment card incorporating a processor and Flash data memory, preferably of large capacity. For further details on smart cards, reference may be made to the ISO (International Standards Organization) series of standards, including ISO 7810, ISO 7811, ISO 7812, ISO 7813, ISO 7816, ISO 9992 and ISO 10102, which are hereby incorporated by reference.

Referring in more detail to FIG. 9, a data and communications bus 204 links components of the card which include a processor 210, working memory 212, timing and control logic 208 and an external interface which may have contacts (ISO 7816) or be contactless (ISO 10536) for providing external access to a bus 204 for reading data from and writing data to the card 202. Also coupled to bus 204 are permanent program memory 216, non-volatile data memory 218 and non-volatile data memory (Flash) content data memory 214. Non-volatile data memory 218 may comprise EEPROM and permanent program memory 216 may comprise ROM, for example, mask-programmed ROM. All the components of FIG. 9 are mounted on a single substrate, in a preferred embodiment bearing contacts for external interface 206.

Processor 200 loads and implements program code from permanent program memory 216. This code comprises operating system code for providing the card with a basic operating system for at least external communications; payment management code for supplying payment data from non-volatile data memory 218 to pay for downloaded content; DRM (Digital Rights Management) and security code, including code to implement content data use rules and code for password controlled access to data and program functions; CRM code for implementing CRM-related rules; and content synthesis code for combining stored content data with additional data provided via external interface 206 for synthesizing complete content item data.

Non-volatile data memory 218 stores data including card identity data, access control data, including password data for validating a user password, access record data for storing a record of access attempts and their outcomes, and content supply data such as system owner website addresses and retailer/distributor website addresses.

Data memory 218 further stores card value data comprising e-money such as publicly verifiable digital signatures, and payment data for storing a payment audit trail including payment amounts and data on to whom payments have been made. The memory 218 also stores RFM (Recency Frequency Monetary) data to provide a record of transactions for market research and customer reward purposes, and CRM data storing customer reward points. Data memory 218 also stores an index of content data items stored in Flash memory 214 and associated content use rules, as well as DRM and royalty data for maintaining an audit trail of use history for rights management tracking. Optionally, data memory 218 may also store supply chain data specifying a supply chain route through which data has been obtained from a content provider, which may be used for rewarding supply chain intermediaries, for example on a commission or reward points basis.

Content data memory 214 preferably comprises at least 100 MB of data storage, partitioned as data blocks of a size selected to match the stored content type. For storing video data, Flash memory 214 preferably comprises >1 GB data storage and the data blocks into which the data memory is partitioned are larger.

Figure 10:
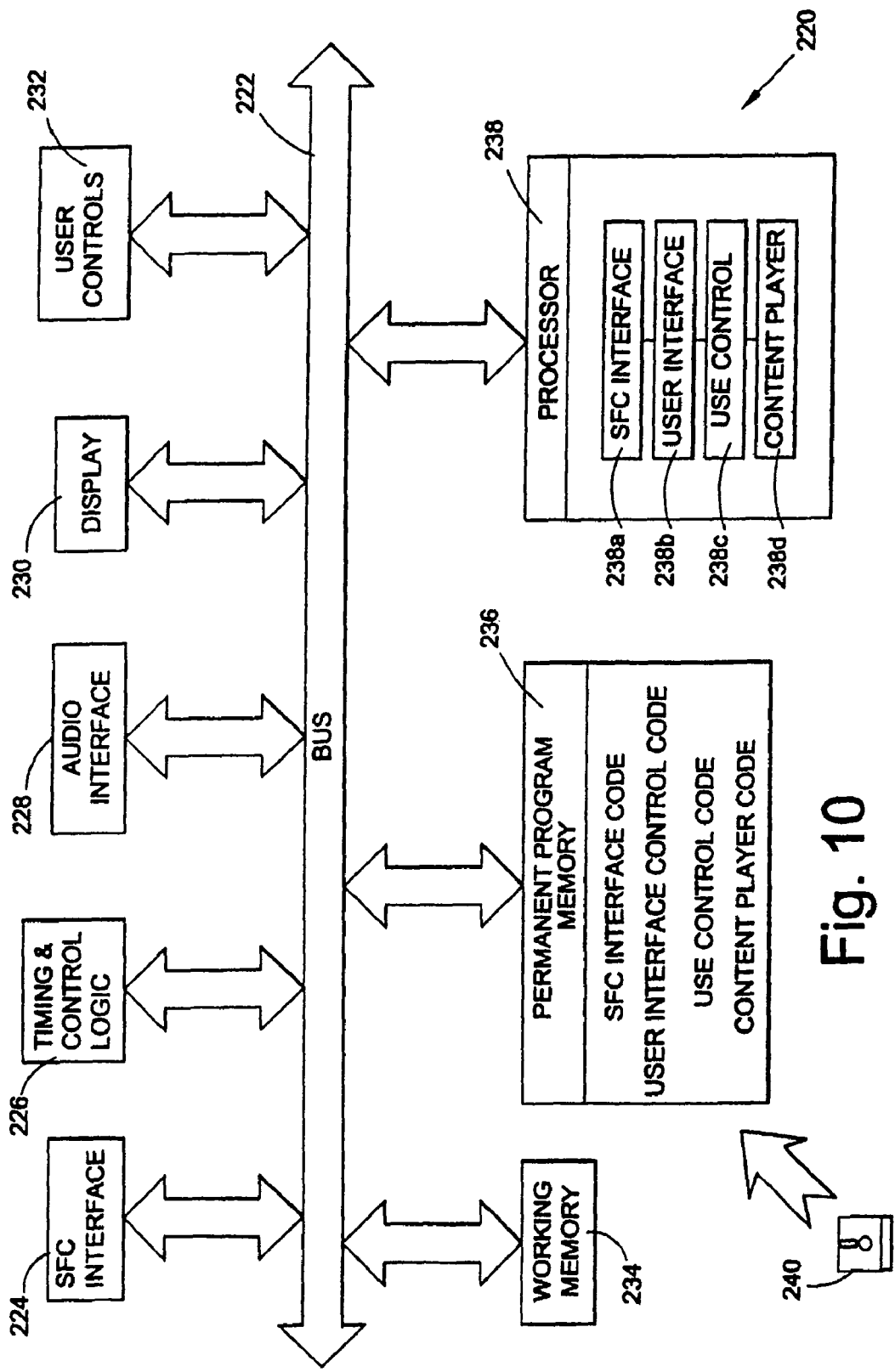
FIG. 10 shows a schematic diagram of components of a data access device.

Referring now to FIG. 10, this shows a schematic diagram of a data access device 220, such as a portable audio/video player. The data access device 220 comprises a conventional dedicated computer system including a processor 238, permanent program memory 236, such as ROM, working memory 234, such as RAM, and timing and control logic 226 all coupled by a data and communications bus 222. Also coupled to the bus are an audio interface 228, a display 230 and user controls 232, for providing a user interface. A smart Flash card interface 224 is coupled to bus 222 for interfacing with a smart Flash card for retrieving and playing stored content data.

Permanent program memory 236 stores program code for implementation by processor 238; this code may also be provided on a data carrier such as a ROM chip or disk 240. Processor 238 implements an SFC interface 238a, a user interface 238b, a content player 238d for retrieving stored content data from a smart Flash card interfaced to the device and for outputting audio and/or video data derived from the retrieved content data (which may comprise compressed audio and/or video data) to a user of the device.

Processor 238 also implements use control 238c for controlling access to and use of contents stored on the smart Flash card by the content access device user. Use control routine 238c and/or DRM and security code in permanent memory 216 on the smart Flash card may also implement digital watermarking and other Secure Digital Music Initiative (SDMI) content protection code as specified in the SDMI portable device specification, part one, version 1.0 (see www.sdmi.org) which is hereby incorporated by reference.

Figure 11A:
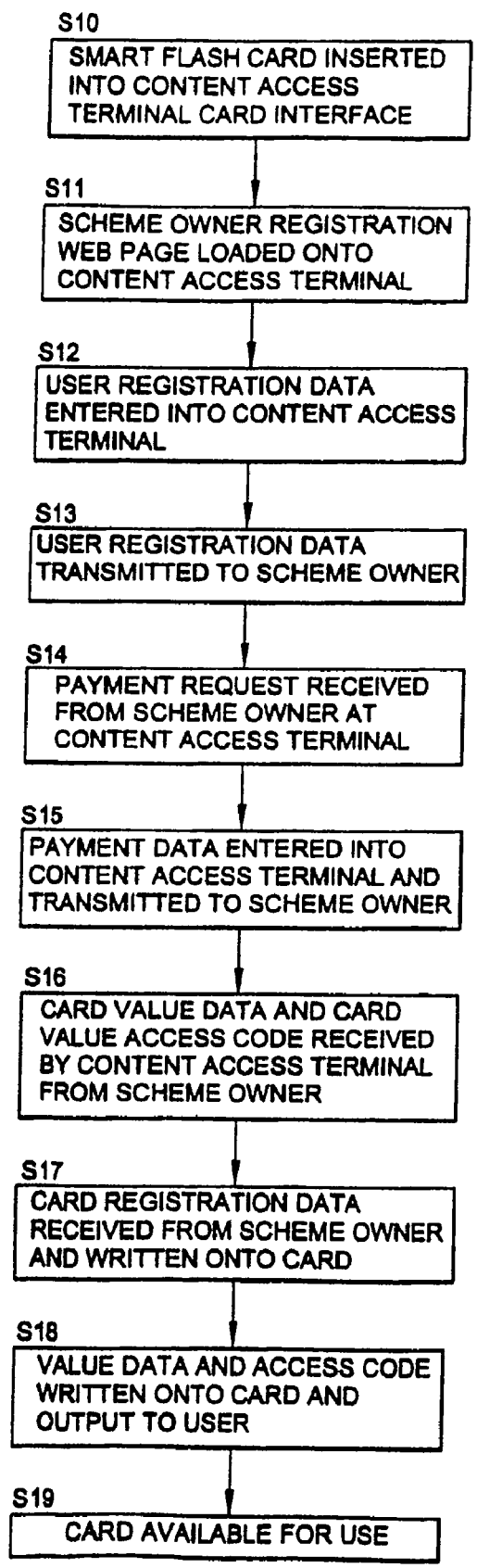
FIGS. 11a and 11b are flow diagrams of a data carrier registration process.
Figure 11B:
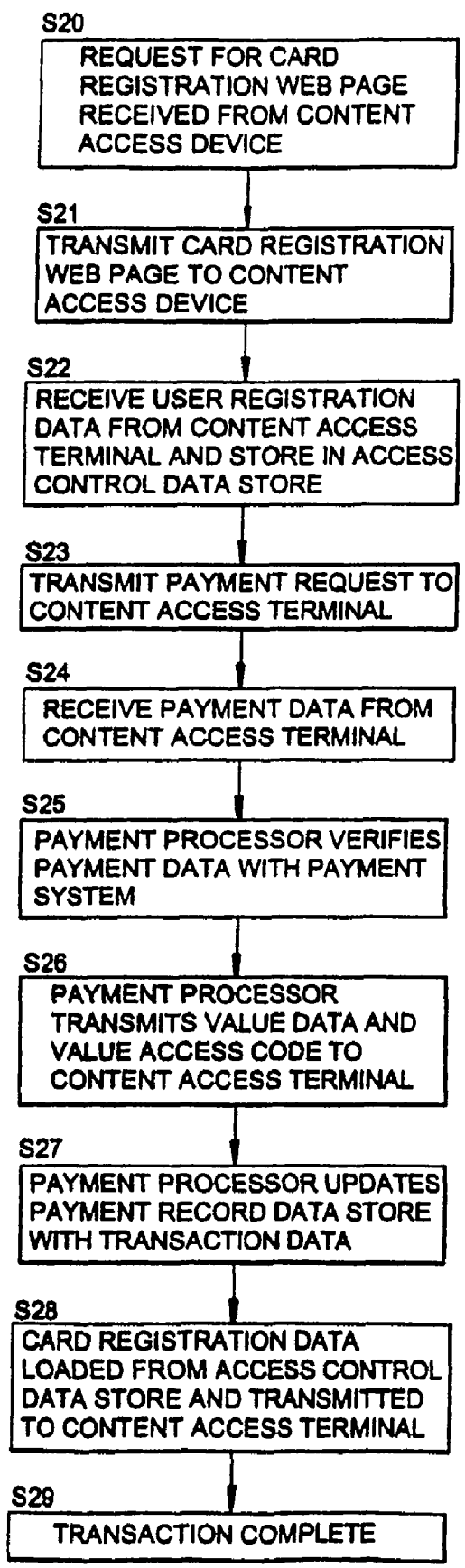

FIGS. 11a and 11b show a flow diagram of a process for registering a data carrier or smart Flash card with a data supplier or system owner operating a data supply system as illustrated in FIG. 6. A smart Flash card may be issued entirely blank, that is, with no prestored content or value, with prestored value but no prestored content, with prestored content but not prestored value (the content being provided free) or with both prestored value and prestored content. Thus, for example, a user may purchase a card with stored value but no stored content over the counter at a retailer. The process of FIGS. 11a and 11b illustrates the registration of a card with neither prestored content nor prestored value. As illustrated the registration process records user registration data in the access control data store 138 of FIG. 6 and writes value data onto the blank card.

At step S10 a smart Flash card is inserted into a content access terminal smart Flash card interface. The system owner web page is then loaded onto the content access terminal and displayed to the user (step S11). User registration data is then entered into the content access terminal (step S12) and transmitted to the system owner (S13). The user registration data may include a user identity, a preferred e-payment system to use and, optionally, a content access PIN or password, and a service level (for example bronze, silver or gold). The optional password may be a password required by the e-payment system for validation of a payment by the user with the card or it may be a password to protect unauthorized access to content on a smart Flash card to protect stored data in the event, for example, of the card being stolen. A single password may serve both these functions. The content access terminal web browser is configured so that all sensitive data passing between the terminal and the system owner is securely transmitted, for example by using a conventional encryption system such as PKI (Public Key Infrastructure).

At step S14 a payment request is received from the system owner at the content access terminal and displayed to the user. At step S15 the user enters payment data into the content access terminal and this payment data is transmitted to the system owner, for adding value to the card. This may, for example, be a credit card transaction as is conventionally used for purchase over the internet. Card value data and a card value access code is then received by the content access terminal from the system owner at step S16. The card value corresponds to the payment made by the user and the value access code may be a password entered by the user at step S12 or may comprise a password for PIN created by payment processor 128 or e-payment system 121 as illustrated in FIG. 6. In a preferred embodiment, the user pays the system owner and the system owner then directly provides digital signature data representing value to the content access terminal for writing onto the smart Flash card.

At step S17, card registration data is received from the system owner by the content access terminal and written onto the smart Flash card. This card registration data comprises user identity data, access control data, payment system specifying data, system owner access data, such as a system owner web page address and other dial-up information. At this stage other data may be entered by the user and written onto the card, including, for example, user preference data, retail outlet and CRM data (alternatively user preference data may be captured at step S12). At step S118 the card value data and card value access code received at step S16 is written onto the card and output to the user visually and, optionally, as a printed record. The card is then available for use, at step S19.

FIG. 11b shows the corresponding registration steps performed by the system owner's data supply system 120. At step S20, a request for a smart card registration web page is received from a content access device and, at step S21, transmitted to the device. User registration data is then received, at step S22, from the content access terminal and stored in content access control data store 138. The system owner's computer system then transmits, at step S23, a payment request to the content access terminal and receives, at step S24, payment data in reply, this payment is then authenticated, at step S25, with an e-payment system such as payment system 121a or b illustrated in FIG. 6, and after verification the payment processor 128 of the computer system transmits, at step S26, value data and a value access code to the content access terminal, for writing onto the smart Flash card. The payment processor then updates the payment record data store 136 with data relating to the transaction (step S27) and, at step S28, retrieves card registration data previously written into the access control data store and transmits this registration data to the content access terminal. At step S29 the transaction is then complete.

Figure 12A:
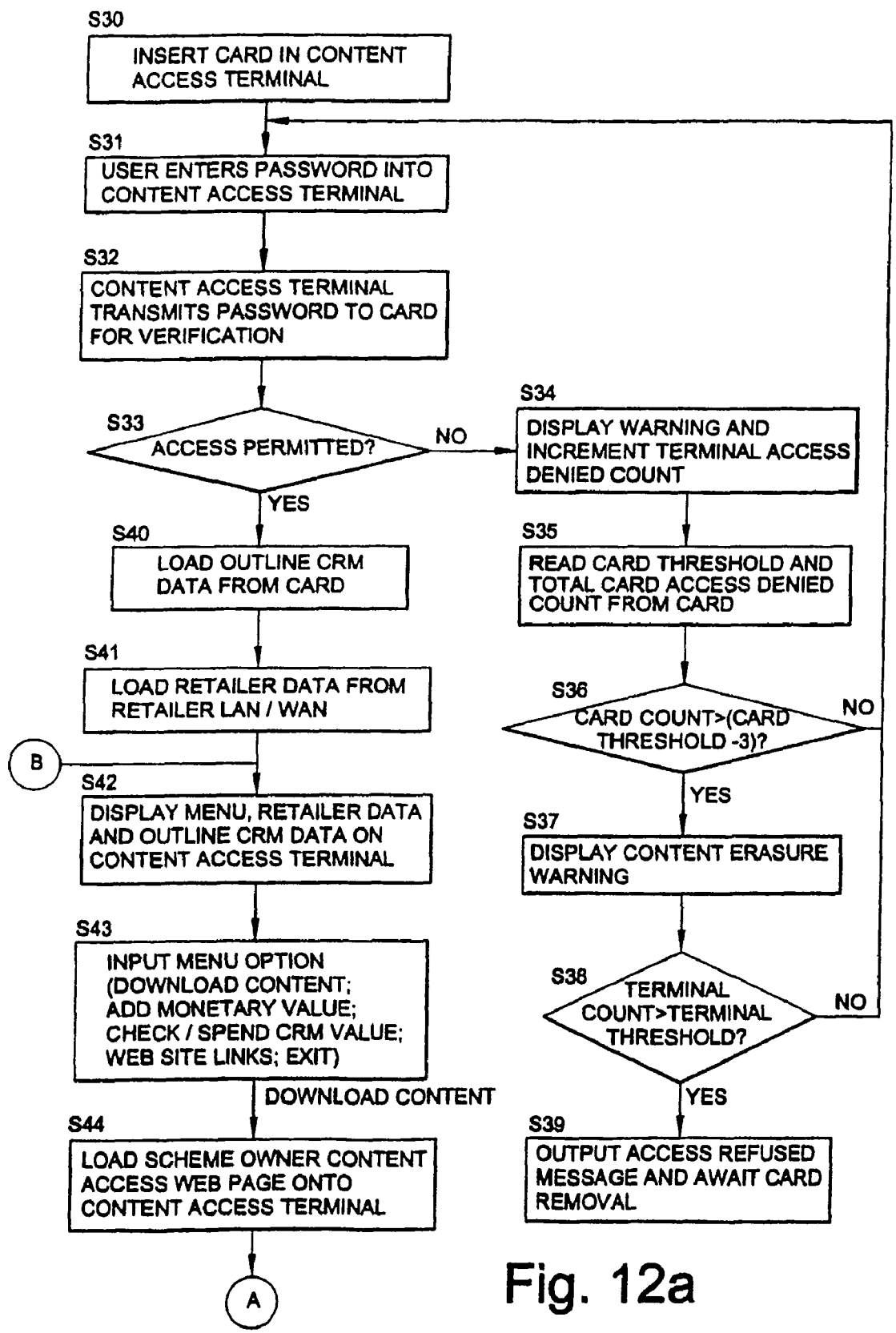
FIGS. 12a-c and 12d-e show, respectively, a flow diagram of data access using a data access terminal; and a flow diagram of data supply using a data supply computer system.
Figure 12B:
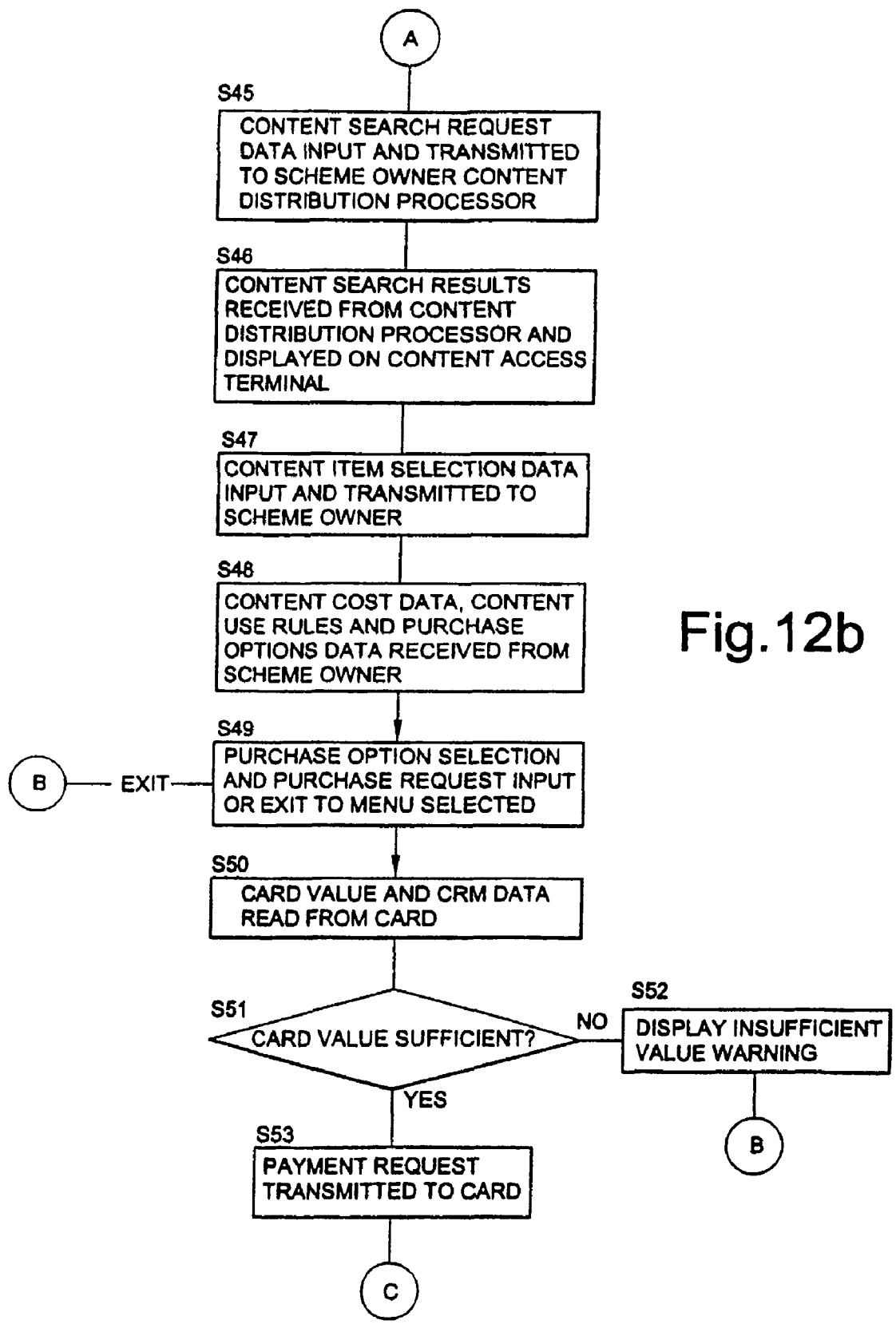
Figure 12C:
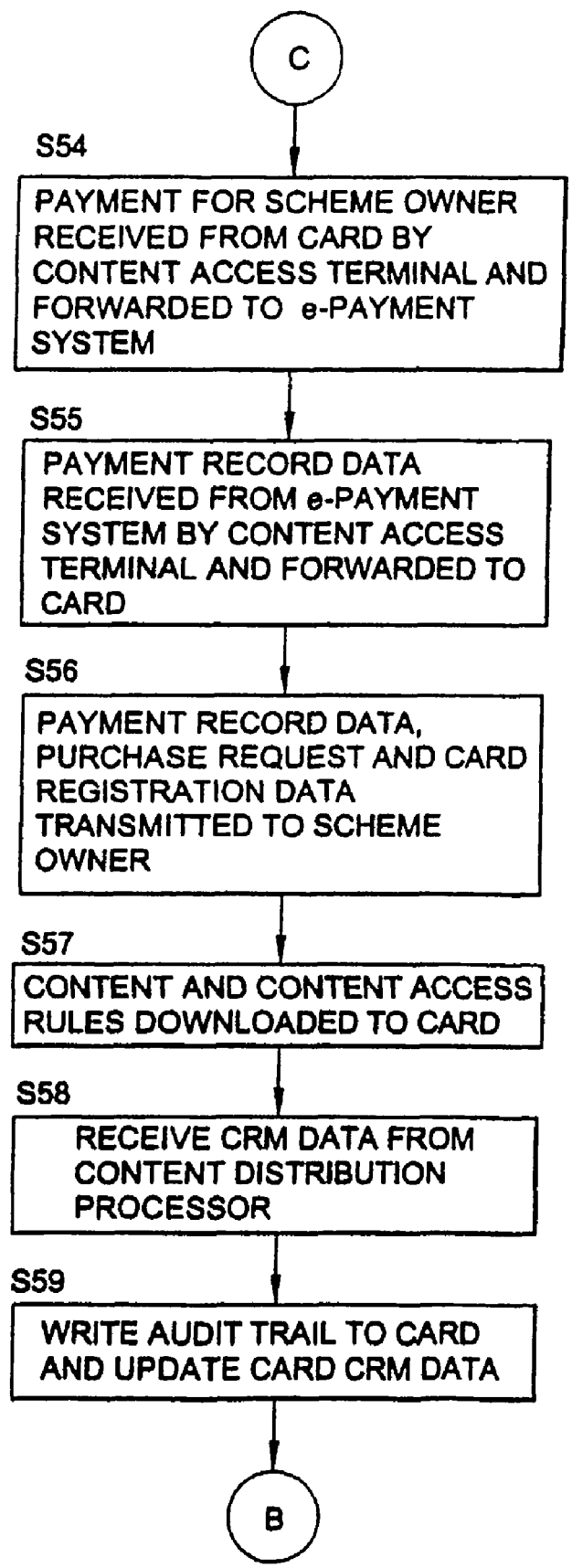

Referring now to FIGS. 12a-c, these illustrate a flow chart for downloading data to a smart Flash card using a data access terminal. At step S30 the smart Flash card is inserted into the content access terminal and the user then enters, at step S31, their password for gaining access to the functionality of the smart Flash card. At step S32, the content access terminal transmits the password to the smart card for verification and the terminal checks, at step S33, whether access is permitted. If access is not permitted a warning is displayed by the terminal, at step S34, and an access denied count is implemented. A threshold count is then read from the card together with a count of the total number of times access to the card has been denied (step S35). At step S36 the terminal checks whether the total number of denied accesses is within three of the card threshold, and if it is not, returns to step S31, while if it is, it proceeds to step S37 where the terminal displays a warning that a further denied access is likely to result in erasure of content stored on the card. At step S38 the terminal then checks whether its count of denied accesses is greater than its threshold value, returning to step S31 if not, and displaying an access refused message at step S39 if the total number of permitted accesses has been exceeded. The system then waits at step S39 for removal of the smart Flash card from the content access terminal.

If access is permitted at step S33, the terminal loads outline CRM data from the card (step S40) and loads retail data, such as targeted advertising, from the retailer LAN/WAN (step S41). At step S42, the terminal then displays a menu of options, retail data such as advertising or CRM-related data and outline CRM data, such as a total number of reward points earned, on the content access terminal. Many options include download content (from a system owner), add monetary value (to the card), check/spend CRM value stored on the card, follow website links, and exit. At step S43, the user inputs a menu option which, in the illustrated flow chart, is the download option. The system thus passes to step S44 and loads the system owner's content access web page onto the content access terminal and displays this to the user.

At step S45, the user enters a content search request, which is transmitted to the system owner content distributor processor 134. Content search results are received back from the content distribution processor, including a content identifier, a brief description, and content cost data for at least one payment option, and these results are displayed on the user on the content access terminal. The user then selects one or more content items at step S47 and the selection is transmitted to the content distribution processor 134 where further content cost data and purchase option data is retrieved from data store 140. At step S48, this content cost and purchase data (including use rule data) is received from the system owner and displayed to the terminal user. The user then selects, at step S49, a purchase option and confirms a purchase request or, alternatively, selects "exit" to return to the menu display of step S42. After one or more content items have been selected, together with a purchase option, hard value and CRM data is read from the smart Flash card at step S50, and at step S51 a check is made to determine whether the monetary and/or CRM (reward points) value stored on the smart Flash card is sufficient to purchase the selected purchase data items. If the card value is insufficient, a warning is displayed at step S52 and the system returns to the menu display at step S42. If the card value is sufficient, at step S53 the content access terminal transmits a payment request to the smart Flash card.

Payment for the data item or items requested may either be made directly to the system owner or may be made to an e-payment system such as e-payment systems 121a and 121b of FIG. 6, with these systems then forwarding payment confirmation data to the system owner computer system. Alternatively, the content access terminal may transmit data to the card to set up a transaction directly with a content provider who, being the copyright owner, would normally receive the majority of the payment.

At step S54, payment data for making a payment to the system owner is received from the smart Flash card by the content access terminal and forwarded to an e-payment system such as e-payment system 121 in FIG. 6. Payment record data, validating payment by the card to the system owner, is then received back from the e-payment system at step S55 by the content access terminal and forwarded to the card for updating payment data on the card. In alternative embodiments, payment data from the card may be provided directly to the system owner's data supply computer for authentication and, optionally, further validation with an e-payment system by the system owner's computer.

Distribution of the payment received by the system owner from the card is performed by the system owner's computer system, as described elsewhere. Such payment distribution will normally provide a small percentage of the total payment to a "owner" or operator of the content access terminal, such as a retailer, distributor, or in other embodiments, mobile communications network operator or cable TV network operator.

In the presently described embodiment, payment record data received in step S55 is transmitted to the system owner to confirm payment by the card and thus it is the content access terminal, in the described embodiment, which authenticates a payment before confirming that the payment has been made to the system owner.

In step S56, together with the payment record data, purchase request and card registration data is transmitted to the system owner to identify one or more content data items for purchase and to identify the purchaser. Then, at step S57, the content access terminal sets up a transaction between the system owner data supply computer and the smart Flash card for download of the identified content items requested from the data supplier to the smart Flash card. The download is preferably arranged so that there is no permanent storage of downloaded data on the content access terminal (although temporary storage in a disk cache may be permissible), and there is further preferably no temporary storage on the content access terminal of complete data for a content data item. This provides data security and reassurance to the content providers.

In the same way as with card registration described with regard to FIG. 11, a secure and trusted link is set up between the content access terminal and/or the smart Flash card and the data supply computer in a conventional manner as is well known to those skilled in the art (for example, using public key data encryption). The data transaction may be set up directly between the smart Flash card and the data supply computer, in which case the content access terminal has no access to unencrypted content data, or it may be set up between the content access terminal and the data supply computer, in which case unencrypted data is written by the content access terminal to the smart Flash card. Standard transmission protocols are used to ensure complete transmission of a content data item, for example by re-transmitting blocks of data which are not correctly received.

Also at step S57, one or more content access rules is received from the system owner data supply computer and written to the smart Flash card so that each content data item has an associated use rule to specify under what conditions a user of the smart Flash card is allowed access to the content data item.

At step S58 the content access terminal receives CRM data from the content distribution processor 134 of the system owner, for example specifying a number of reward points earned by downloading the selected content items. This CRM data will normally be written to the smart Flash card (step S59), but may additionally or alternatively be stored in the content access terminal or in a data store of the content access terminal owner so that the reward points are held by the distributor/retailer/cable TV operator. Finally, also at step S59, a complete record of details of the transactions between the smart Flash card and the content access terminal, the smart Flash card and the system owner, the smart Flash card and the e-payment system, and the content access terminal and the e-payment system and/or data supply computer is recorded on the smart Flash card to provide an audit trial. The system then returns to the menu display at step S42.

The add monetary value menu option provided by the menu operates in a similar manner to that described with regard to steps S15 and S16 of FIG. 11a and steps S24 to S27 of FIG. 11b. In embodiments of the system in which the smart Flash card operates either in a debit (pre-pay) or credit mode, operating mode data may be loaded from the card together with outlying CRM data at step S40. If the card is operating in a credit mode then, at step S41, the content access terminal reads content use data records from the card and proceeds correspondingly to steps S47 and S48 to determine the value of the content accessed and then proceeds according to steps S15 and S16 of FIG. 11a and steps S24 to S27 of FIG. 11b to retrieve payment for the accessed content from the card owner. Where enhanced access control features are provided, access control data read from the smart Flash card or entered into the content access terminal at step S31 is used, in step S44, to access the system owner content access webpage and, in some embodiments, to set up a secure connection between the content access terminal and system owner data supply computer at step S44.

Figure 12D:
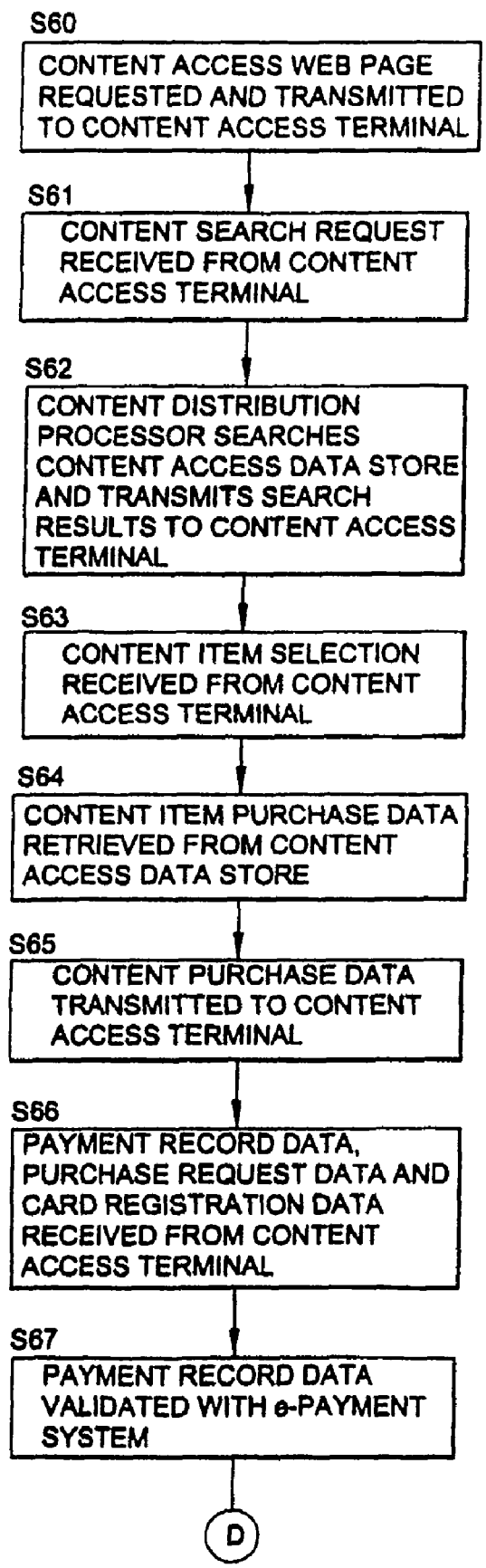
Figure 12E:
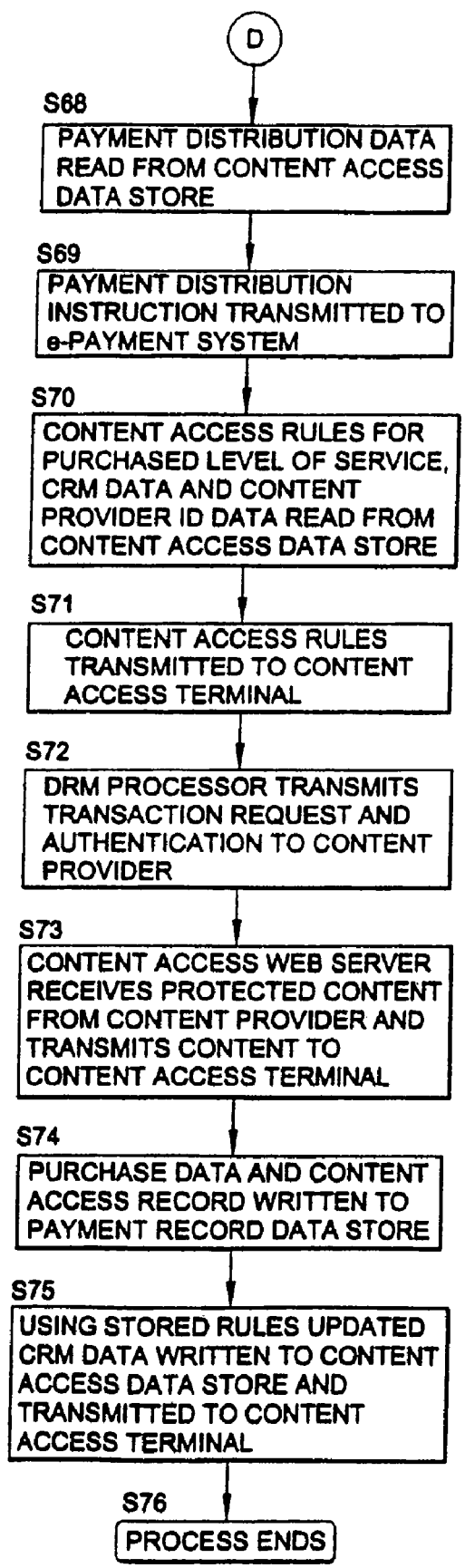

Referring now to FIGS. 12d and 12e, these show steps in a process implemented on the system owner's data supply computer for providing content data to a content access terminal and thence to a data carrier such as a smart Flash card. At step S60 the system owner's content access web page is requested by a content access terminal and transmitted to the requesting terminal. A search request for searching for a content data item is received, at step S61, from the content access terminal, and at step S62 content distribution processor 134 of the content supply system searches content access and DRM data store 140 and transmits the search results to the content access terminal. The search results will normally comprise a content item identifier, a content item description, optionally a content item sample, and at least one content item price, for example for a default payment option. The search results may comprise a set of content data items, either selected by type or artist or comprising some predetermined selection in a similar manner to a compilation of tracks on a CD.

At step S63 content item selection data identifying one or more content items is retrieved from the content access terminal, and at step S64 content item purchase data for the selected content items is retrieved from content access and DRM data store 140. This purchase data will normally include, for each selected content item, one or more prices and purchase options. Purchase option data may simply comprise one of a set of standard options, for example "1" to purchase outright, "2" to rent for a period of time, "3" to rent for a number of plays, and "4" to rent with a final purchase option. The purchase option data may also indicate when a content item is available free.

At step S65 the content purchase data is transmitted to the content access terminal, and at step S66 payment record data, indicating a payment made from the smart Flash card to the system owner, purchase request data, card registration data and, optionally, access control data, is received from the content access terminal. The payment record data confirms a payment for the requested data items, the purchase request data specifies the payment option selected for the selected content items, and the card registration data provides data for keeping records of the transaction and providing reward points; the access control data may be required for additional data security. At step S67 the payment record data, in the described embodiment of the system, is validated with an e-payment system such as e-payment system 121 of FIG. 6. As illustrated in the flow chart, the data supply system computer checks with the e-payment system that a payment has in fact been made to the system owner. In other embodiments of the system, payment may be made directly to the system owner, and either concurrently with the content access and download process, or at some later stage, payment data received from the smart Flash card may be verified with the e-payment system for reimbursement of the system owner.

At step S68, payment distribution data is read from the content access data store 140. This data will indicate how payment made by the card for the data is to be distributed among recipients. In one embodiment, recipient's payment fractions are specified in general terms in the content access data store, for example copyright owner 0.90, system owner 0.01, retailer/distributor 0.02, publisher 0.02, creator 0.05. Identification of who is the relevant copyright owner is stored in the data store together with the content item identifier, but may be selected from more than one possible content provider for the data item, and identification of who is the relevant retailer/distributor may be determined from, for example, content access identity information received from the content access terminal when the system owner content access web page is accessed at step S60. At step S69, payments are then distributed in accordance with the payment distribution data, either by direct distribution of value-bearing digital signatures to the relevant parties, or by issuing a payment distribution instruction to e-payment system 121. Preferably the data supply system stores records of individual card payments and, at intervals, combines the payment distribution data for a plurality of individual records to output payment data for distributing the total payment received by the data supply system from a batch of individual payments.

At step S70, content access rules for the purchased level of service are read from the content access data store. These rules could, for example, specify that only a predetermined number of accesses to the content are permitted, for example 10 plays. Alternatively, the rules could provide access for, say, one month from the download date. Other rules may provide unlimited plays but only on specified players, for example set top boxes owned by a particular cable TV network (as determined by content access device identification data provided to a smart Flash card from a content access device). A content provider identification for the requested content data is also read from the content access data store at step S70 together with CRM data for issuing reward points.

At step S71, content access rules for the requested content data items are retrieved from data store 140 and transmitted to the content access terminal. Then, at step S72, DRM processor 130 of the data supply system transmits a transaction request and authentication data to the content provider identified in step S70. This request identifies the system owner data supply system to the content provider in a secure manner, either by means of physical security, such as a dedicated connection from the system owner data supply system to the content provider, or by means of an electronically secure connection such as an encryption connection. Then, at step S73, the content access web server 124 receives protected content from the content provider, comprising the data items requested by the content access terminal, and transmits this protected content to the content access terminal. The content is preferably protected by data encryption but may be protected in other ways, for example, by digital watermarking or simply by the large number of other transactions taking place at any one time over the internet. The data supply system computer, at this point, essentially acts as a transparent data forwarder, forwarding data from the content provider to the content access terminal, which itself is preferably effectively transparent, using data exchange interface 200c to transmit the protected content data directly to the smart Flash card. As described with regard to FIG. 12d, the content download protocol includes error protection and transmission retry protocols to ensure substantially error-free data transmission.

Once content has been downloaded to the content access terminal (and, hence, to the smart Flash card) at step S74 a record of the purchase data and content accessed is written to payment record data store 136, to provide an audit trail. Then, at step S75, updated CRM data is written to the content access data store 140, using rules stored in the content access data store, in conjunction with a record of the downloaded data items, to calculate the CRM data (i.e. reward points). The updated CRM data is then also transmitted to the content access terminal, where it can be forwarded to the smart Flash card. Then, at step S76, the process ends.

Figure 13:
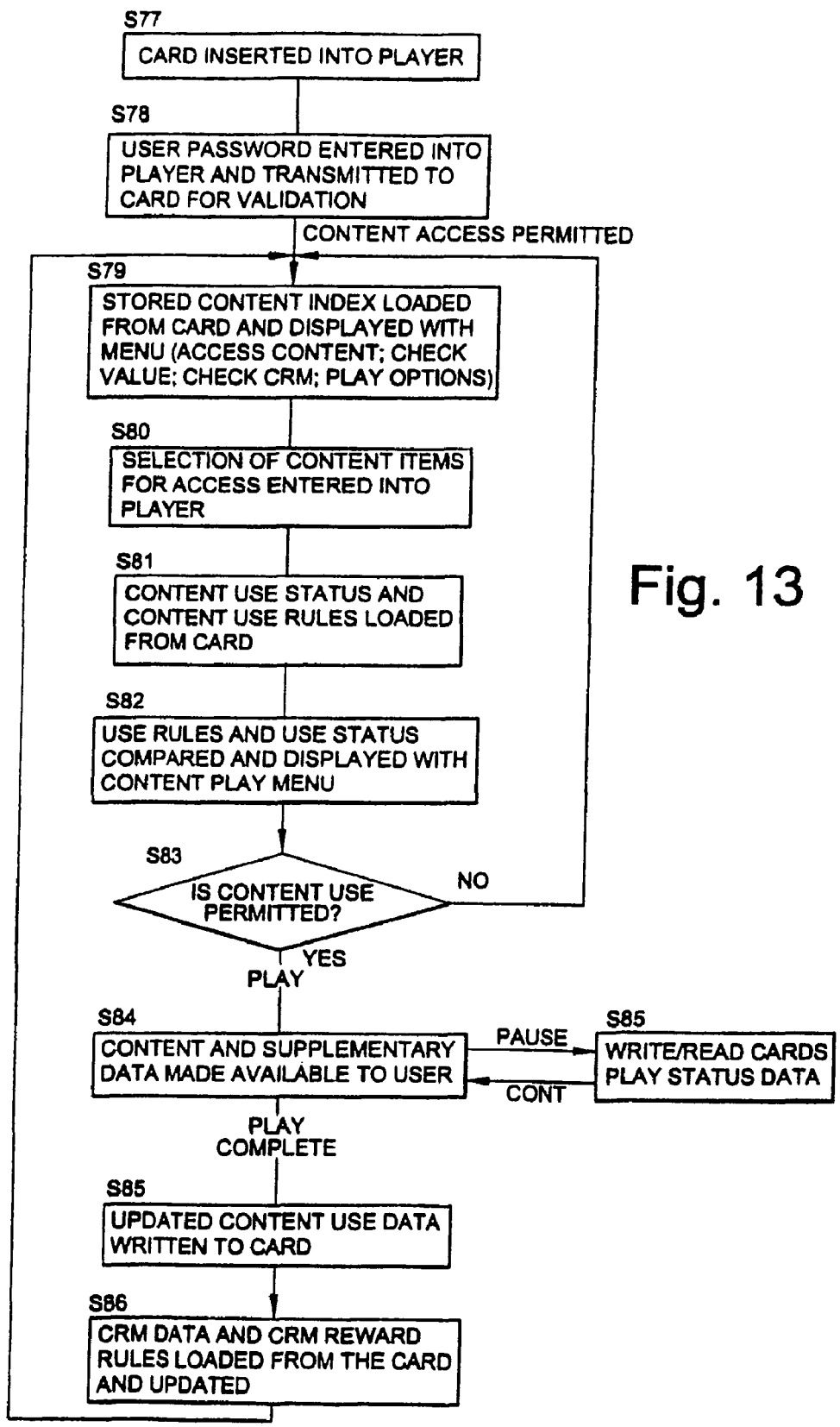
FIG. 13 shows a flow diagram of data retrieval using a data access device.

Referring now to FIG. 13, this shows a flow chart for user access of stored data on a smart Flash card using a data access device such as the MP3 player of FIG. 1. At step S77 the smart Flash card is inserted into the player and, at step S78, the user enters a password into the player, which is transmitted to the smart Flash card for validation (this step is optional). If access to stored data on the card is permitted, the process proceeds to step S79 where an index of content data items stored on the card is loaded from the card and displayed together with a menu. The menu provides options including access content, check value (stored on the card), check CRM data (such as reward points) stored on the card, and play options (such as no video, repeat play, random play, and the like). If the user wishes to access content data items stored on the smart Flash card, a user selection of such items is entered into the player at step S80, for example using cursor keys or a pointer; additionally or alternatively a default play option may be provided to, for example, play the most recently downloaded data.

At step S81 content use status data for the selected content items is loaded from the smart Flash card together with associated content use rules. Then, at step S82, the use rules and present use status for each selected content item are compared and the result is displayed together with a content play menu. The content play menu may comprise a simple list of the selected content items with items not available for access highlighted in, for example, red. Alternatively, more detailed content access permission data may be displayed such as the purchased contents use for a content data item, the actual use of the data item made so far, and the available remaining use. Then, at step S83, the player determines whether content use is permitted. If use is not permitted, the process returns to step S79 to re-display the menu; if content use is permitted the system proceeds to step S84.

At step S84 the selected content data items whose use is permitted are retrieved sequentially from the card, decoded as necessary, and the decoded audio and/or video data is made available to the user, for example, by providing audio output at a headphone socket on the player and displaying video output on the player display. Preferably, the player also retrieves supplementary data stored in association with a content data item, such as advertising data, or for a web-enabled player, hot links to web sites for sale of goods or services, particularly those related to the accessed content data item or those identified to appeal to users accessing the data item (such as pop group merchandising or Harley Davidson (trade mark) motor bikes for rock music/video).

Preferably, the player is provided with "pause" and "continue" functions and corresponding user controls. When "pause" is selected the process passes to step S85 and writes a record to the smart Flash card comprising data specifying how much use has been made of the accessed content data item. In the case of music or video data, this may comprise start and end time markers or simply a play duration time (the start time being predetermined, for example at the start of the data item). In the case of a game the partial use data may comprise an elapsed play time or a number of lives left. In the case of a data item providing a service such as access to stock and share prices, or weather information, or a share dealing service, the partial use information may comprise a status record indicating the status of an interrupted transaction. When the "continue" function is selected on the player the process returns to step S84.

To allow for the smart Flash card being removed from the player between pause and continue events, a check may be made at step S78, by reading a partial use status data from the card, to determine whether a content data item was left in a pause state when the card was last used. If such a pause state is determined to exist for a content data item, the process may then jump directly to step S85 to allow a user to resume or continue with the content data item and proceed directly to step S84.

Once play is complete the process moves to step S85 where updated content use data is written to the smart Flash card. This updated use data provides a record of the use of a content made in step S84. This record can then be used in steps S81 to S83 to determine, on a subsequent occasion, whether further use of the content data item is permitted. Finally, at step S86, customer reward management reward rules are loaded from the smart Flash card together with CRM data stored on the card. The CRM data is then updated, using the CRM reward rules, to reflect the use of content data items made in step S84 and the updated data is written back to the smart Flash card.

In one embodiment the CRM reward rules are determined by the content access terminal owner (retailer/distributor/cable or mobile network operator) and are written onto the card when registering the card. The updated CRM data may then be accessed by a content access terminal for spending or other use when the smart Flash card is next inserted into a content access terminal. Once the CRM data has been updated, the process returns to step S79 to display the content index and menu.

The specific embodiments of the invention described above use communication over the internet and web-based technology but this is not essential, and the invention may be implemented using any electronic communications network, such as a wide area network, local area network, wireless network, or conventional land line network. Likewise, the invention is applicable to the internet, intranets, extranets, and other internet protocol networks.

The skilled person will understand that many variants to the system are possible and the invention is not limited to the described embodiments but encompasses modifications which lie within the spirit and scope of the present invention.

What is claimed is:

1. A computer system for providing data to a data requester, the system comprising:
    a communication interface;
    a data access data store for storing records of data items available from the system, each record comprising a data item description and a pointer to a data provider for the data item;
    a program store storing code implementable by a processor;
    a processor coupled to the communications interface, to the data access data store, and to the program store for implementing the stored code, the code comprising:
    code to receive a request for a data item from the requester;
    code to receive from the communications interface payment data comprising data relating to payment for the requested data item;
    code responsive to the request and to the received payment data, to read data for the requested data item from a content provider; and
    code to transmit the read data to the requester over the communications interface.

2. A computer system as claimed in claim 1, wherein said data access data store further comprises payment distribution information indicating to whom payments should be made for a data item; and further comprising code to output payment data for a data item for making payments for the item when the item is supplied to a said requester.

3. A computer system as claimed in claim 1, wherein said data access data store further comprises data item access rule data for output to the requester with said data item.

4. A computer system as claimed in claim 3, further comprising code to select access rule data for output with a data item in response to said payment data.

5. A computer system as claimed in claim 4, wherein said data access data store further comprises requester reward data associated with a said data item, and said code further comprises code to update said reward data in response to said payment data.

6. A computer system as claimed in claim 1, further comprising an access control data store coupled to said processor for storing access control data comprising a requester identifier, corresponding requester system access data and payment system data for identifying a payment system for use by the requester.

7. A computer system as claimed in claim 1, further comprising content synthesis code to generate substantially complete item data from partial item data provided from two or more sources.

8. A method of providing data to a data requester comprising:
    receiving a request for a data item from the requester;
    receiving payment data from the requester relating to payment for the requested data;
    reading the requested data from a content provider responsive to the received payment data; and
    transmitting the read data to the requester.

9. A method of providing data to a data requester as claimed in claim 8 further comprising:
    reading payment distribution information from a data store; and
    outputting payment data to a payment system for distributing the payment for the requested data.

10. A method of providing data to a data requester as claimed in claim 8 further comprising:
    transmitting data access rule data to requester with the read data.

11. A method of providing data to a data requester as claimed in claim 10 further comprising:
    selecting said access rule data dependent upon said payment data.

12. A data access system comprising:
    a data supply computer system for forwarding data from a data provider to a data access terminal;
    an electronic payment system for confirming an electronic payment;
    a data access terminal for communicating with the data supply system to write data from the data supply system onto a data carrier; and
    a data carrier for storing data from the data supply system and payment data;

wherein data is forwarded from the data provider to the data carrier on validation of payment data provided from the data carrier to the electronic payment system.

13. A data access system according to claim 12 further comprising a payment distribution store and wherein the electronic payment system makes payments according to data in the payment distribution store associated with the forwarded data on confirmation of the payment and/or provision of the forwarded data to the card.

14. A data access system according to claim 12 further comprising a data use rule data store and wherein data use rule data is provided to the data carrier with the forwarded data for controlling user access to the forwarded data.

15. A data access system according to claim 14 wherein the data use rule data is selected dependent upon the payment data.

16. A computer system for providing data to a data requester, the system comprising:
    a communication interface;
    a data access data store for storing records of data items available from the system, each record comprising a data item description and a resource locator identifying a data provider for the data item;
    a program store storing code implementable by a processor;
    a processor coupled to the communications interface, to the data access data store, and to the program store for implementing the stored code, the code comprising:
    code to receive a request for a data item from the requester;
    code to receive from the communications interface payment data comprising data relating to payment for the requested data item;
    code, responsive to the request and to the received payment data to output the item data to the requester over the communication interface; wherein
    said data access data store further comprises payment distribution information indicating to whom payments should be made for a data item; and
    further comprising code to output payment data for a data item for making payments for the item when the item is supplied to a said requester.

17. A computer system for providing data to a data requester, the system comprising:
    a communication interface;
    a data access data store for storing records of data items available from the system, each record comprising a data item description and location data identifying an electronic address for a provider for the data item;
    a program store storing code implementable by a processor;
    a processor coupled to the communications interface, to the data access data store, and to the program store for implementing the stored code, the code comprising:
    code to receive a request for a data item from the requester:,
    code to receive from the communications interface payment data comprising data relating to payment for the requested data item;
    code responsive to the request and to the received payment data to output the item data to the requester over the communication interface; wherein
    said data access data store further comprises data item access rule data for output to the requester with a said data item; and
    further comprising code to select access rule data for output with a data item in response to said payment data.

18. A method of providing data to a data requester comprising:
    receiving a request for a data item from the requester;
    receiving payment data from the requester relating to payment for the requested data;
    transmitting the requested data to the requester;
    reading payment distribution information from a data store; and
    outputting payment data to a payment system for distributing the payment for the requested data.

19. A method of providing data to a data requester comprising:
    receiving a request for a data item from the requester;
    receiving payment data from the requester relating to payment for the requested data;
    transmitting the requested data to the requester; and
    transmitting data access rule data to requester with the read data.

* * * * *

(12) POST-GRANT REVIEW CERTIFICATE (23rd)

United States Patent
Racz

(10) Number: US 7,942,317 J1
(45) Certificate Issued: May 19, 2016

(54) DATA STORAGE AND ACCESS SYSTEMS

(75) Inventor: Patrick Racz

(73) Assignee: SMARTFLASH LLC

Trial Numbers:

CBM2014-00112 filed Apr. 3, 2014
CBM2014-00113 filed Apr. 3, 2014

Petitioner: Apple, Inc.

Patent Owner: Smartflash LLC

Post-Grant Review Certificate for:

Patent No.: 7,942,317
Issued: May 17, 2011
Appl. No.: 12/014,558
Filed: Jan. 15, 2008

The results of consolidated CBM2014-00112 and CBM2014-00113 are reflected in this post-grant review certificate under 35 U.S.C. 328(b).

POST-GRANT REVIEW CERTIFICATE
U.S. Patent 7,942,317 J1
Trial No. CBM2014-00112
Certificate Issued May 19, 2016

AS A RESULT OF THE POST-GRANT REVIEW PROCEEDING, IT HAS BEEN DETERMINED THAT:

Claims 1, 6-8, 12, 13, 16 and 18 are cancelled.

\* \* \* \* \*